(12) United States Patent
Kim et al.

(10) Patent No.: US 10,852,054 B2
(45) Date of Patent: Dec. 1, 2020

(54) REFRIGERATOR

(71) Applicant: SAMSUNG ELECTRONICS CO., LTD., Suwon-si (KR)

(72) Inventors: Min Soo Kim, Seoul (KR); Choong Hyo Jang, Daejeon (KR); Keon Kuk, Yongin-si (KR)

(73) Assignee: SAMSUNG ELECTONICS CO., LTD., Suwon-si (KR)

( * ) Notice: Subject to any disclaimer, the term of this patent is extended or adjusted under 35 U.S.C. 154(b) by 0 days.

(21) Appl. No.: 15/512,716

(22) PCT Filed: Aug. 25, 2015

(86) PCT No.: PCT/KR2015/008884
§ 371 (c)(1),
(2) Date: Mar. 20, 2017

(87) PCT Pub. No.: WO2016/056745
PCT Pub. Date: Apr. 14, 2016

(65) Prior Publication Data
US 2017/0292776 A1    Oct. 12, 2017

(30) Foreign Application Priority Data
Oct. 7, 2014  (KR) .......................... 10-2014-0134945

(51) Int. Cl.
*F25D 23/06* (2006.01)
*F25D 23/08* (2006.01)
*F25D 21/04* (2006.01)

(52) U.S. Cl.
CPC ........... *F25D 23/066* (2013.01); *F25D 21/04* (2013.01); *F25D 23/061* (2013.01);
(Continued)

(58) Field of Classification Search
CPC .............................. F25D 23/066; F25D 23/087
See application file for complete search history.

(56) References Cited

U.S. PATENT DOCUMENTS 3,401,997 A * 9/1968 Hanifan ................ F25D 17/062
312/406.1
4,080,021 A * 3/1978 Pringle .................. F25D 23/066
312/406.2
(Continued)

FOREIGN PATENT DOCUMENTS

CN         1207489          2/1999
CN       103398527        11/2013
(Continued)

OTHER PUBLICATIONS

Canadian Office Action dated Mar. 12, 2018, in corresponding Canadian Patent Application No. 2,963,924.
(Continued)

*Primary Examiner* — Christopher R Zerphey
(74) *Attorney, Agent, or Firm* — Staas & Halsey LLP

(57) ABSTRACT

A refrigerator having an improved structure configured to increase the energy efficiency includes a main body provided with an inner case and an outer case, a storage compartment formed inside of the inner case, an insulation material provided between the inner case and the outer case to insulate the storage compartment and a flange having the anisotropy having different heat resistance distribution to insulate the storage compartment, together with the insulation material.

12 Claims, 23 Drawing Sheets

(52) U.S. Cl.
CPC ......... *F25D 23/062* (2013.01); *F25D 23/085* (2013.01); *F25D 2201/10* (2013.01); *F25D 2201/126* (2013.01); *F25D 2201/14* (2013.01)

(56) References Cited

U.S. PATENT DOCUMENTS

| | | | |
|---|---|---|---|
| 4,199,205 A | 4/1980 | Cooke et al. | |
| 7,204,568 B2* | 4/2007 | Lim ...................... | F25D 23/087 277/645 |
| 8,703,032 B2* | 4/2014 | Menon ................ | B29C 33/3878 264/227 |
| 9,506,687 B2* | 11/2016 | Li .......................... | F25D 23/087 |
| 9,546,308 B2* | 1/2017 | Pesika ........................ | C09J 7/00 |
| 2005/0076575 A1* | 4/2005 | Cittadini ............... | F25D 23/087 49/498.1 |
| 2005/0242529 A1* | 11/2005 | Kim ...................... | F25D 23/087 277/628 |
| 2009/0007587 A1* | 1/2009 | Lanzl .................... | A47F 3/0434 62/449 |

FOREIGN PATENT DOCUMENTS

| | | |
|---|---|---|
| CN | 103453711 | 12/2013 |
| DE | 890 053 | 9/1953 |
| EP | 0 974 795 | 1/2000 |
| EP | 0 974 795 A2 | 1/2000 |
| EP | 1 079 187 A1 | 2/2001 |
| JP | 49-20162 | 5/1972 |
| JP | 11-108544 | 4/1999 |
| JP | 11-173747 | 7/1999 |
| JP | 2007-218509 | 8/2007 |
| JP | 2007218509 * | 8/2007 ............. F25D 21/04 |
| JP | 2014-504253 | 2/2014 |
| KR | 10-2004-0057345 | 7/2004 |

OTHER PUBLICATIONS

Australian Office Action dated Jan. 10, 2018, in corresponding Australian Patent Application No. 2015328918.
European Office Action dated Oct. 27, 2017 in corresponding European Patent Application No. 15 848 346.1.
European Search Report dated Aug. 23, 2017, in corresponding European Patent Application No. 15848346.1.
International Search Report dated Dec. 14, 2015 in corresponding International Application No. PCT/KR2015/008884.
Written Opinion of the International Searching Authority, PCT/ISA/237, dated Dec. 14, 2015 in corresponding International Application No. PCT/KR2015/008884.
Australian Office Action dated Apr. 23, 2018 from Australian Patent Application No. 2015328918, 3 pages.
Chinese Office Action dated Mar. 12, 2019 from Chinese Patent Application No. 201580054756.7, 15 pages.
Canadian Office Action dated Dec. 13, 2018 from Canadian Application No. 2,963,924, 4 pages.
Canadian Office Action dated Aug. 6, 2019 from Canadian Patent Application No. 2,963,924, 4 pages.
European Office Action dated Nov. 14, 2019 from European Patent Application No. 15848346.1, 6 pages.
Korean Office Action dated Sep. 1, 2020 from Korean Application No. 10-2014-0134945, 11 pages.
European Office Action dated Sep. 29, 2020 from European Application No. 15848346.1, 68 pages.

* cited by examiner

[Fig. 1]
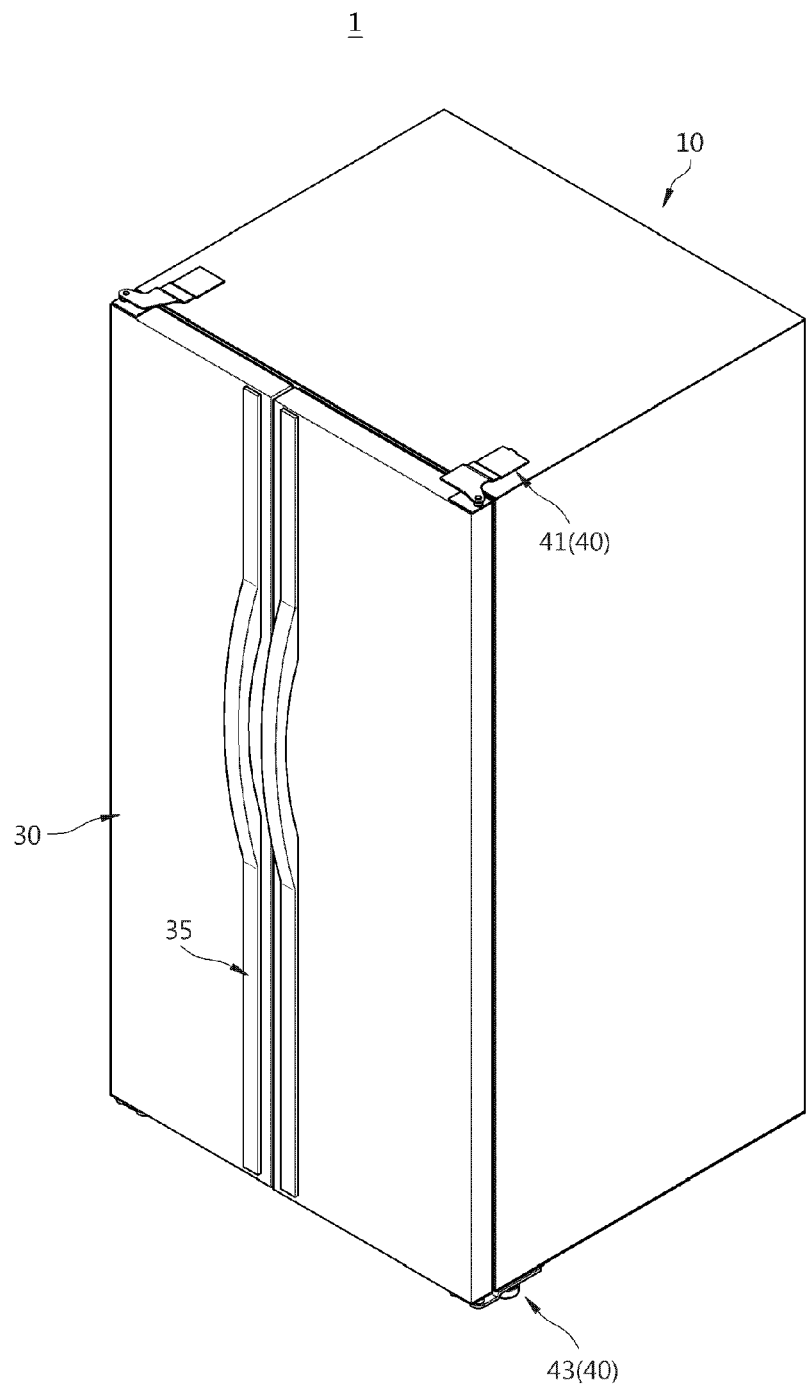

[Fig. 2]
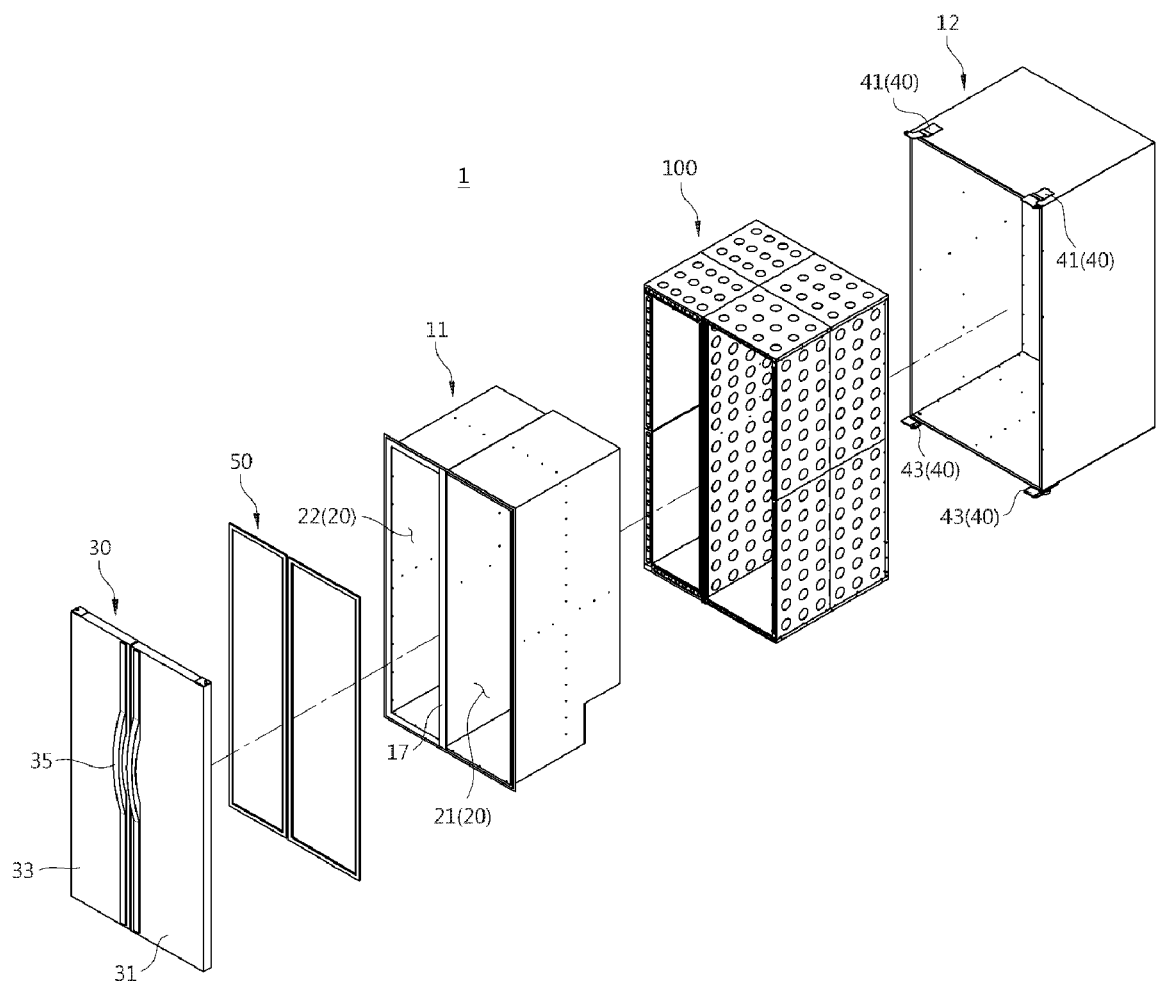

[Fig. 3]
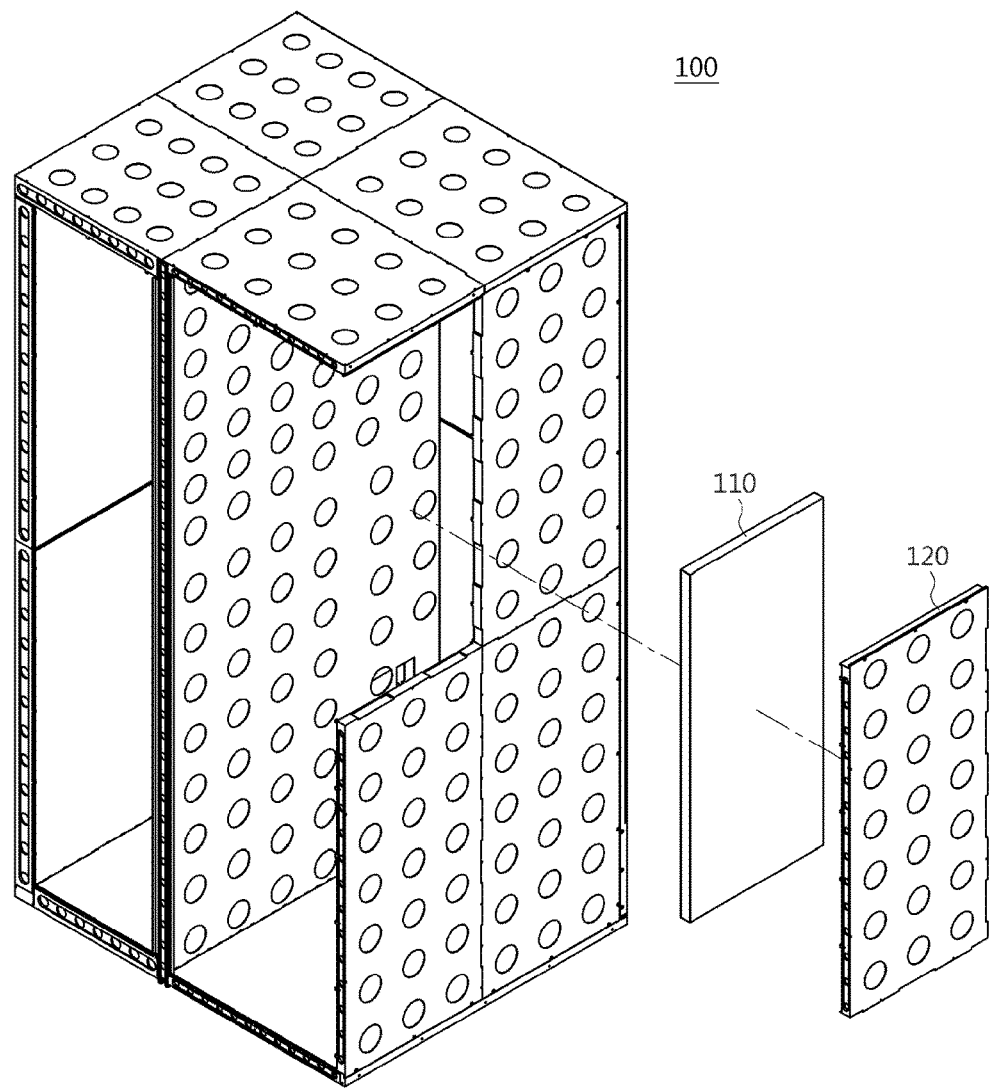

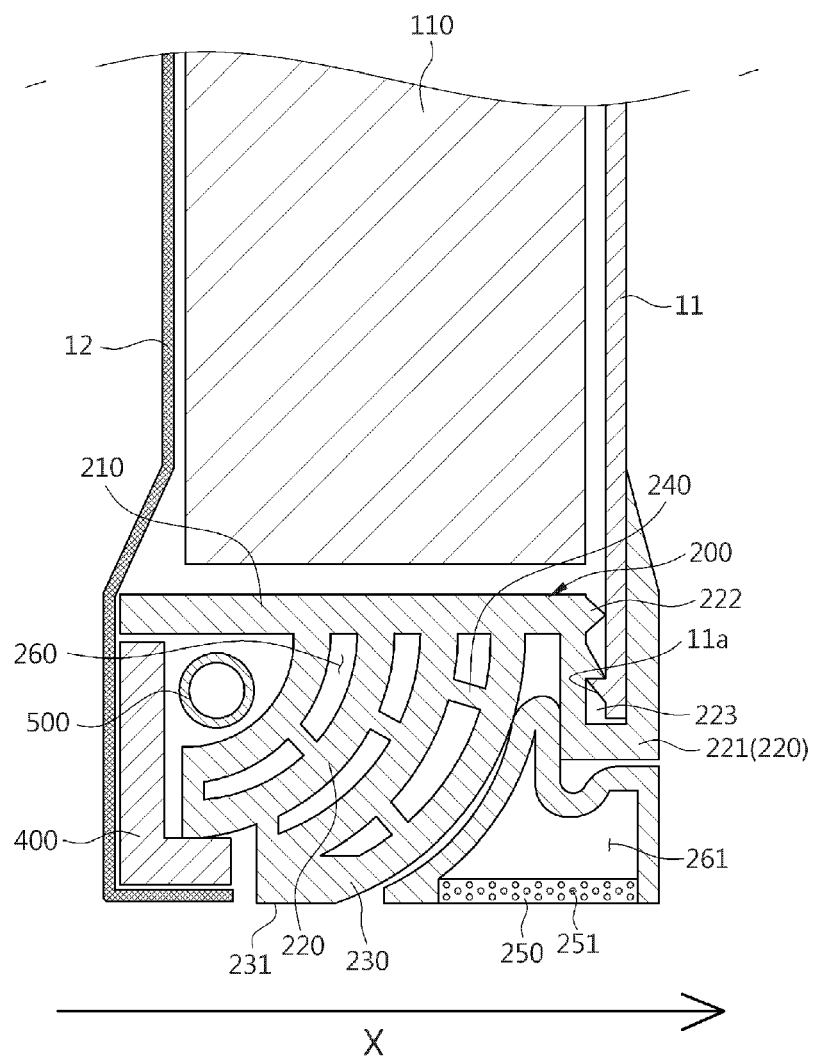
[Fig. 4]

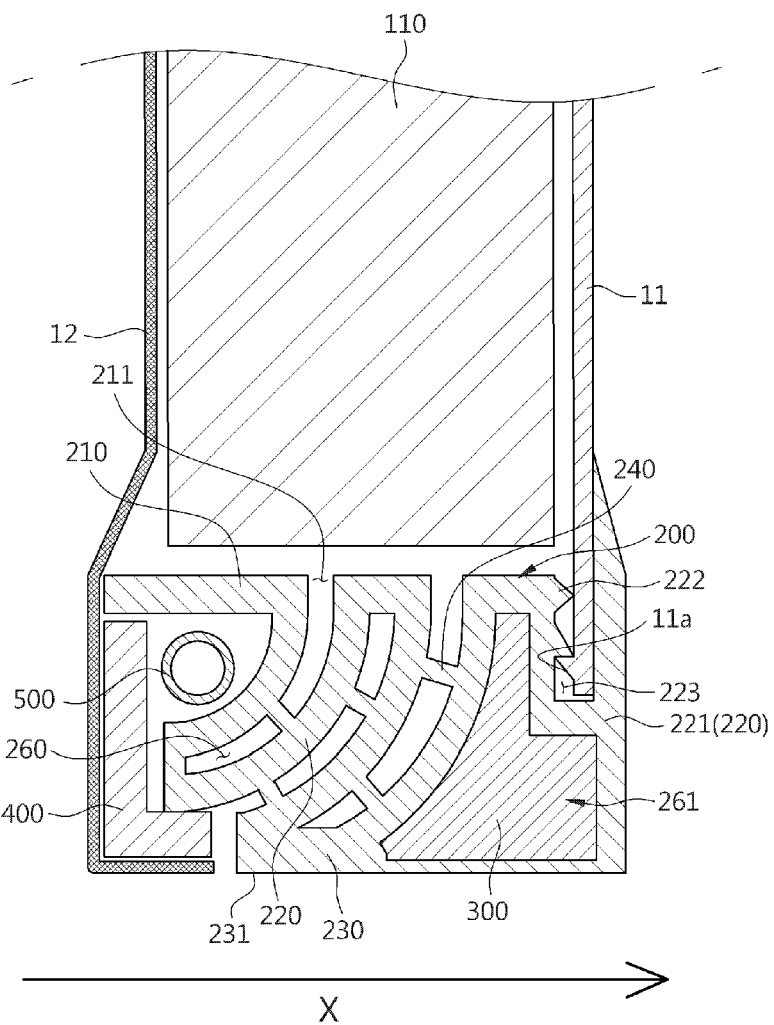
[Fig. 5]

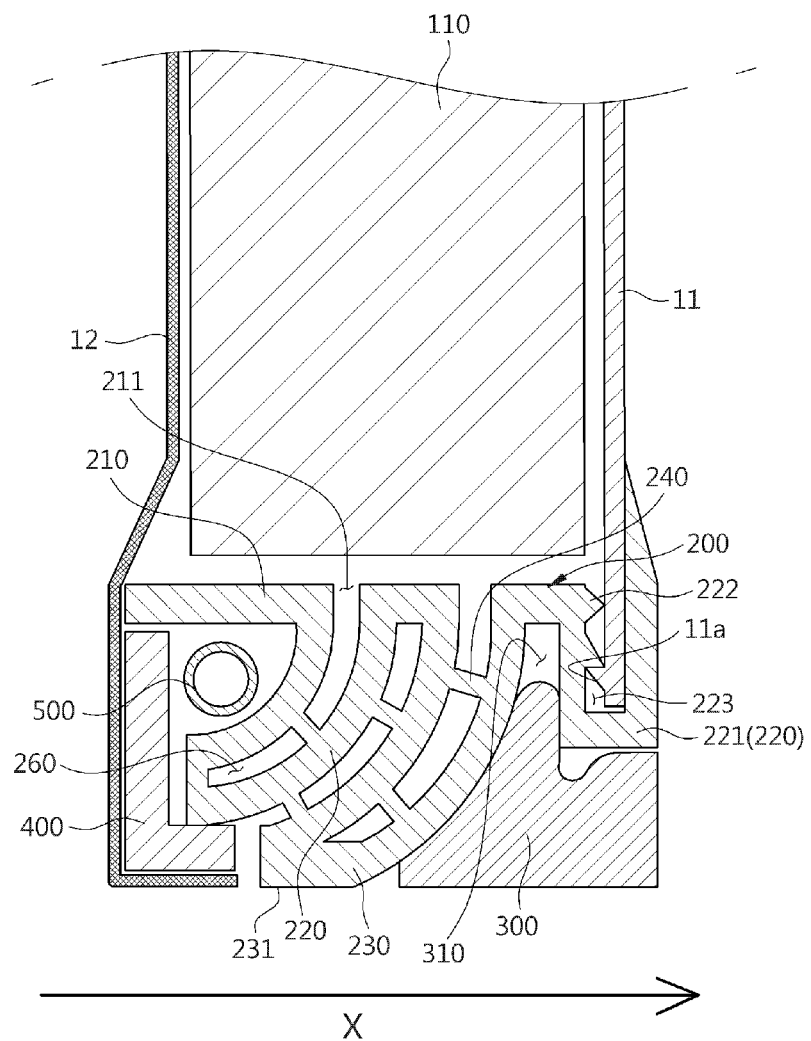
[Fig. 6]

[Fig. 7]
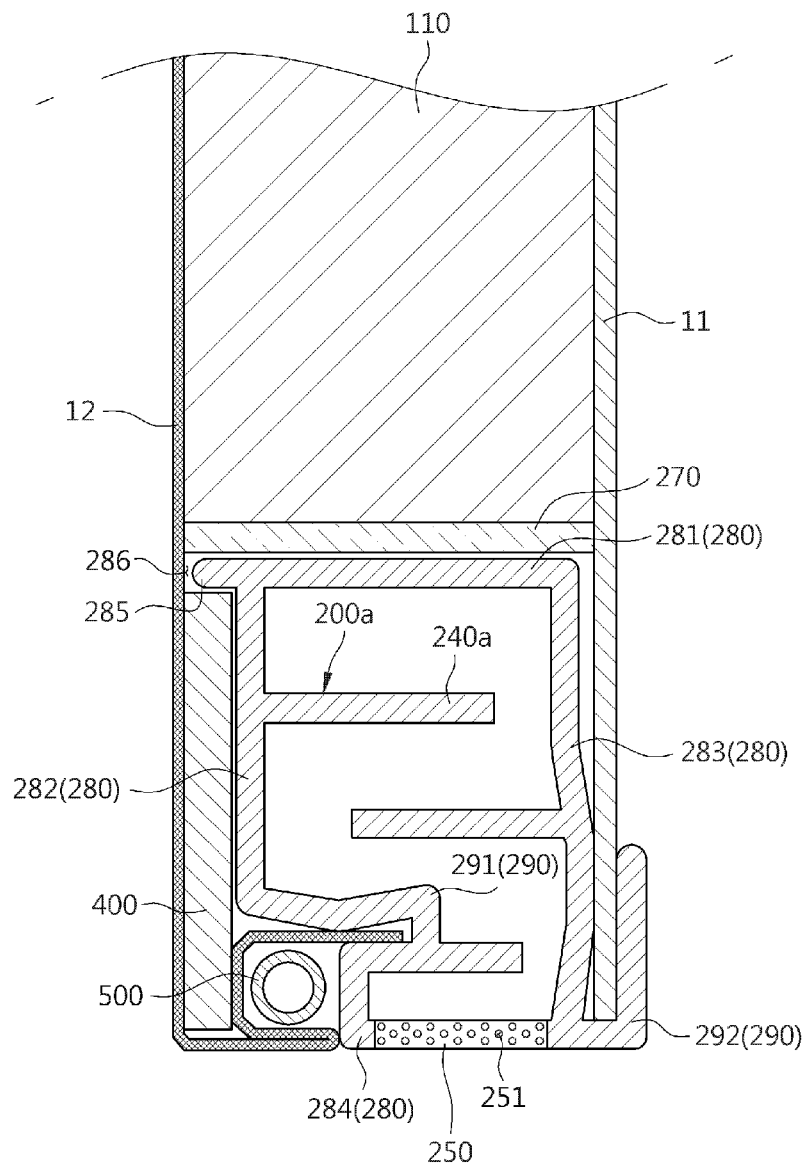

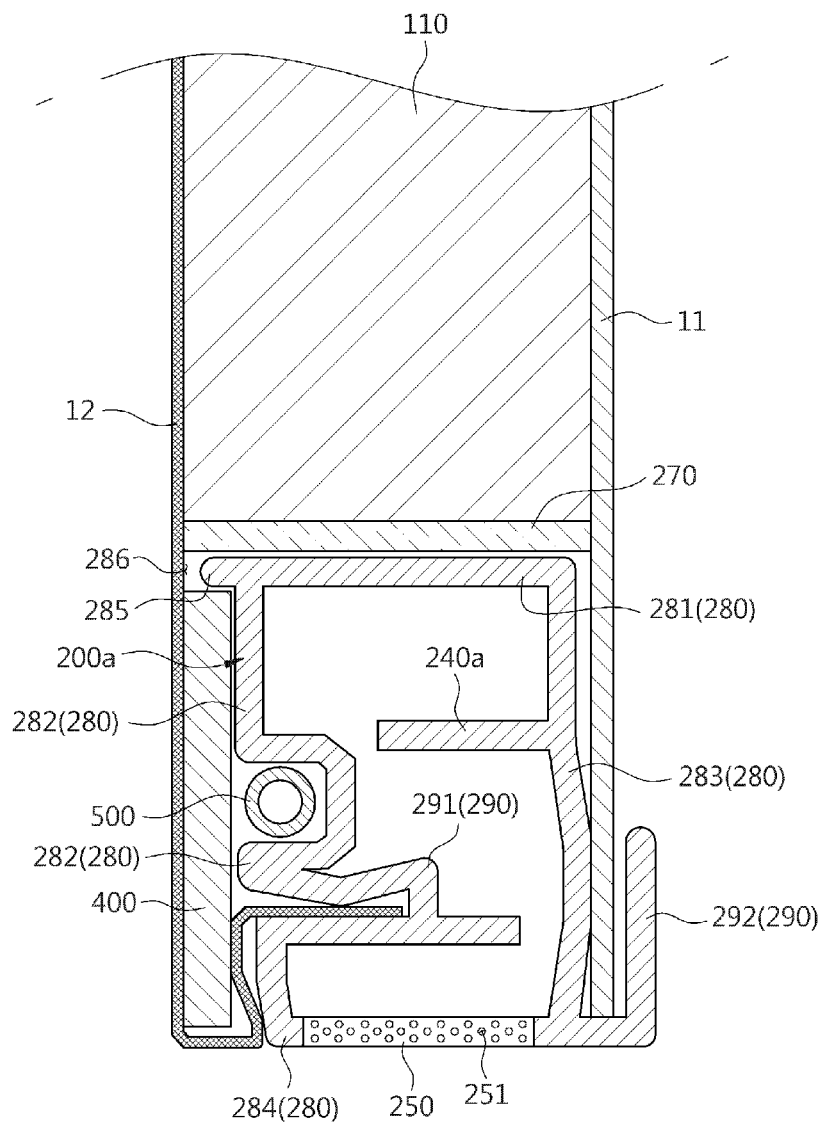
[Fig. 8]

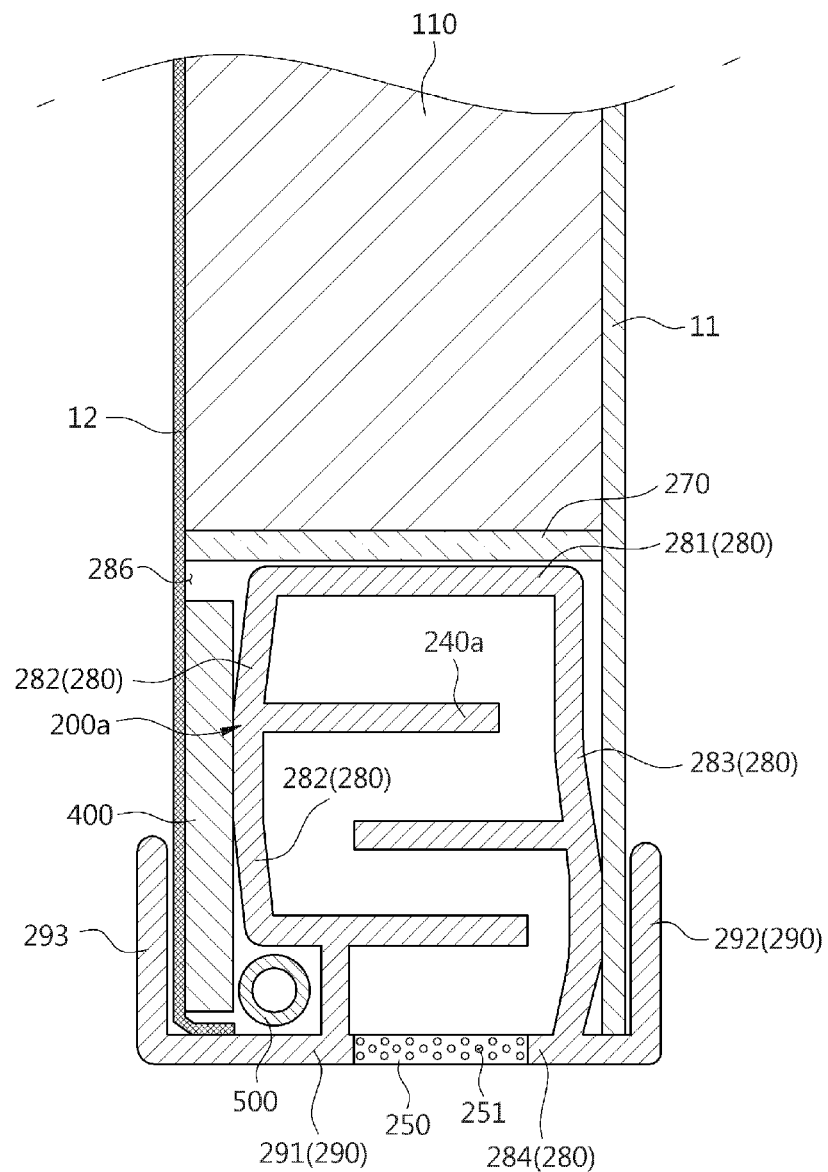
[Fig. 9]

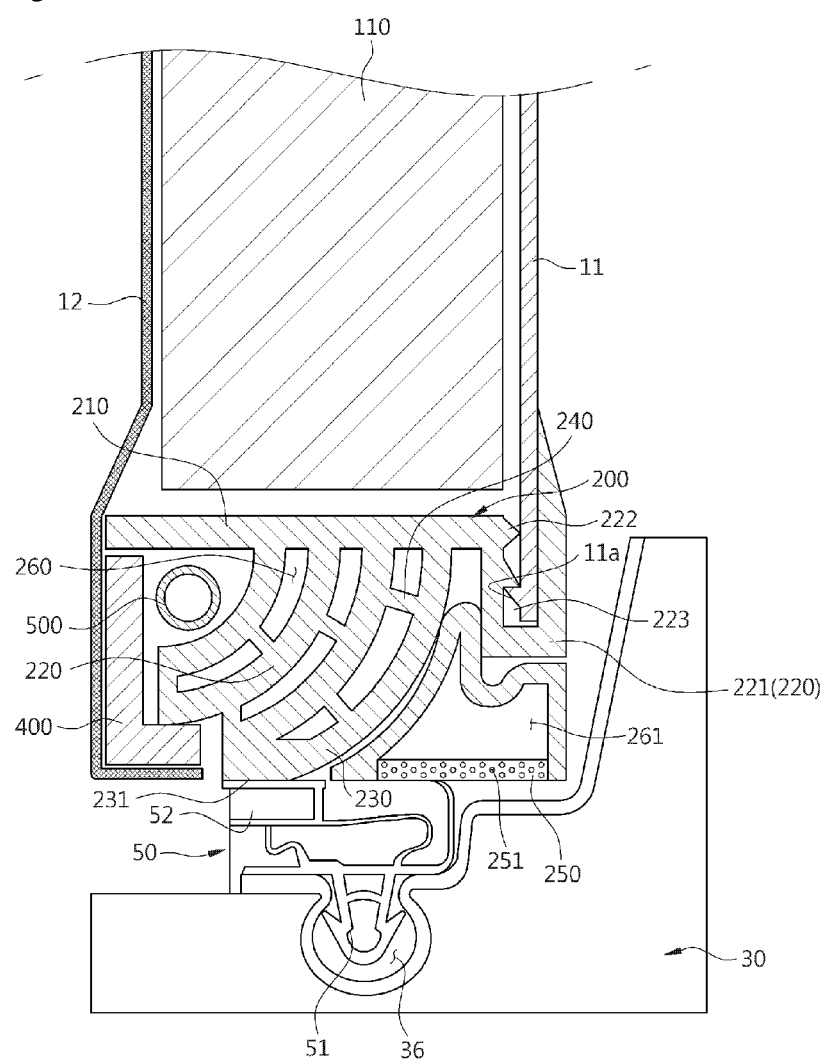
[Fig. 10a]

[Fig. 10b]
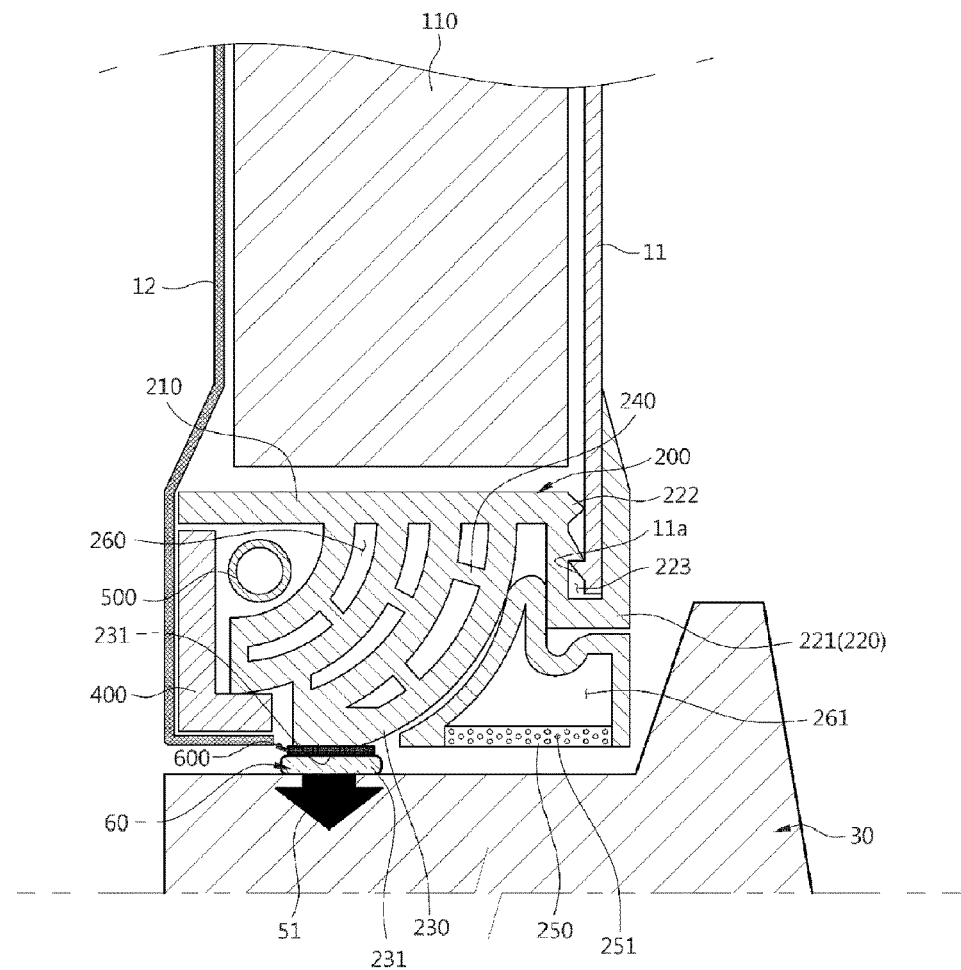
[Fig. 11]
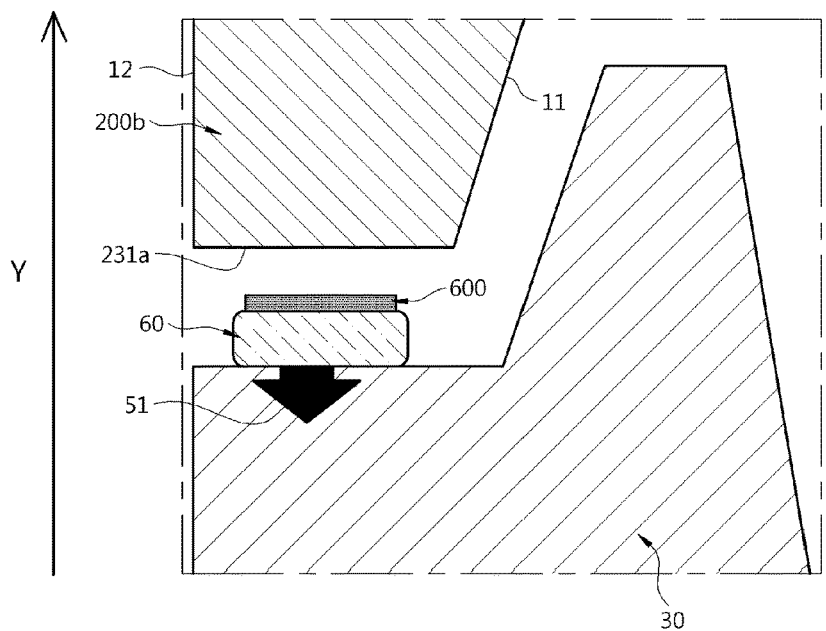

[Fig. 12]
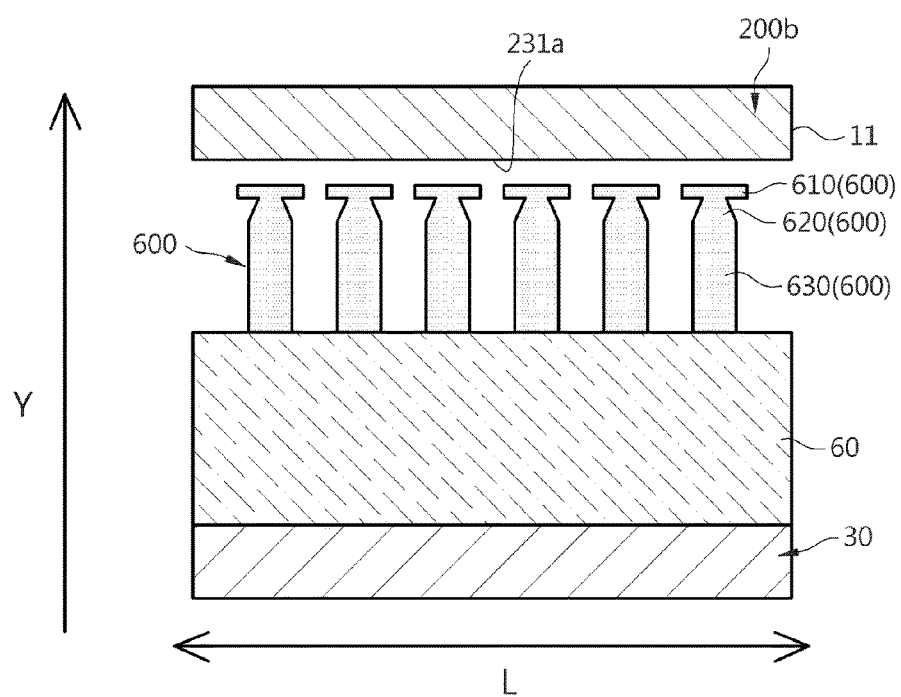

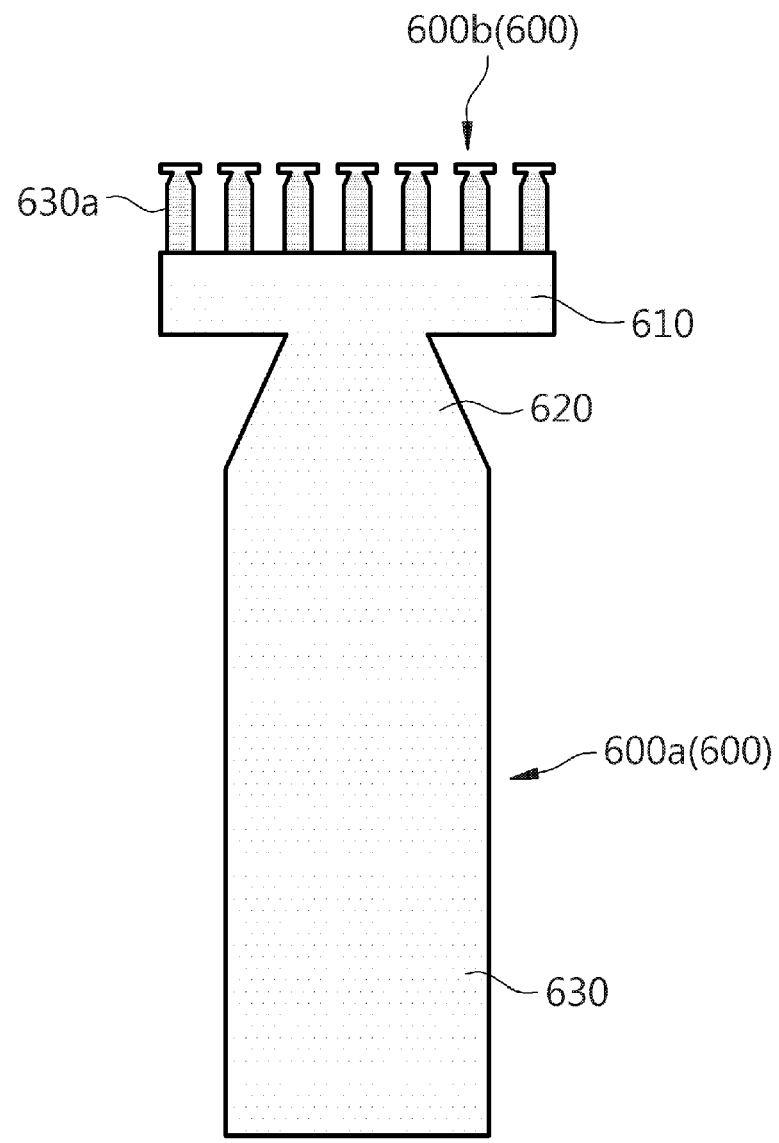
[Fig. 13]

[Fig. 14]
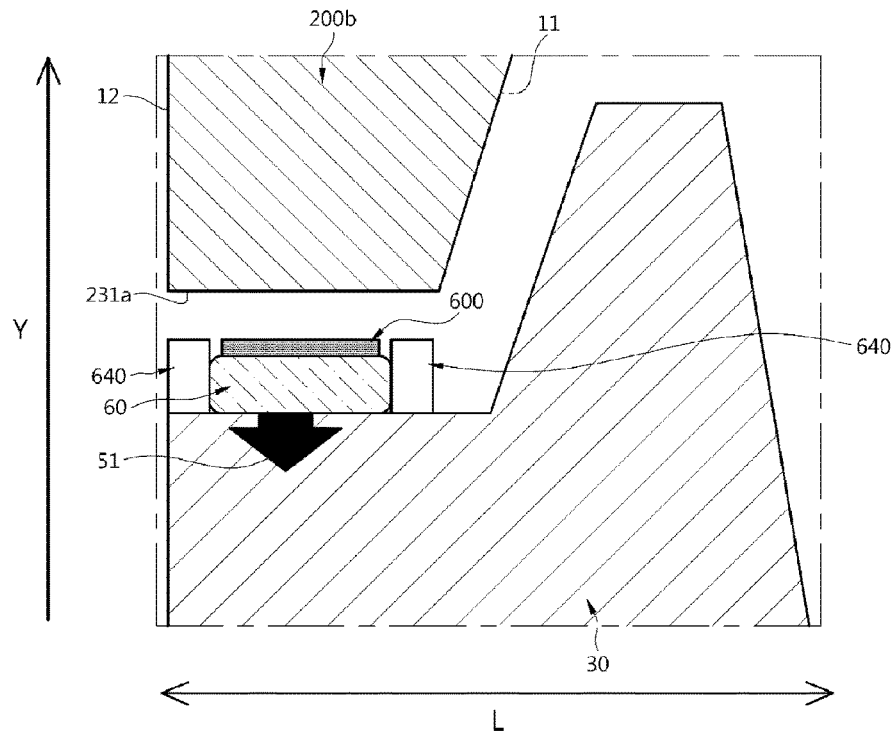
[Fig. 15a]
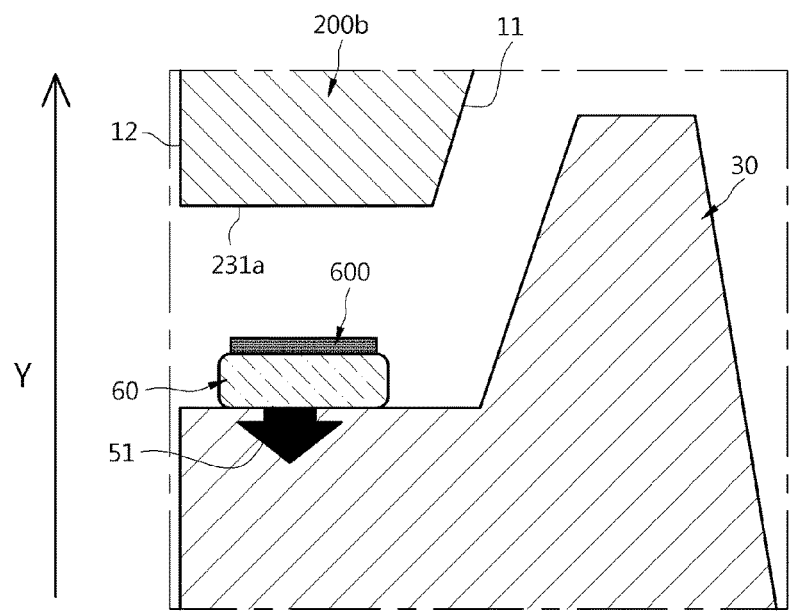

[Fig. 15b]
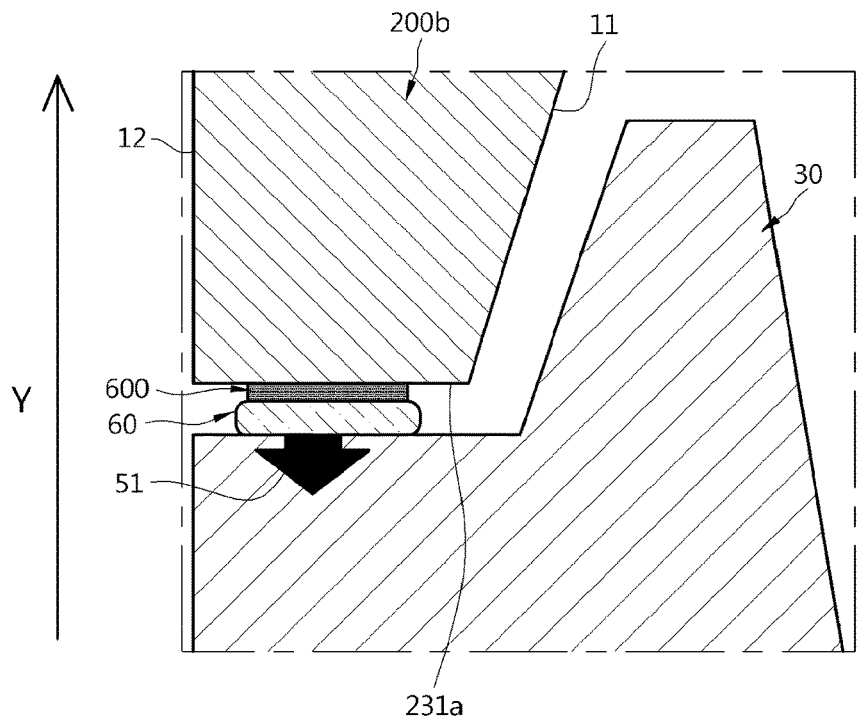
[Fig. 15c]
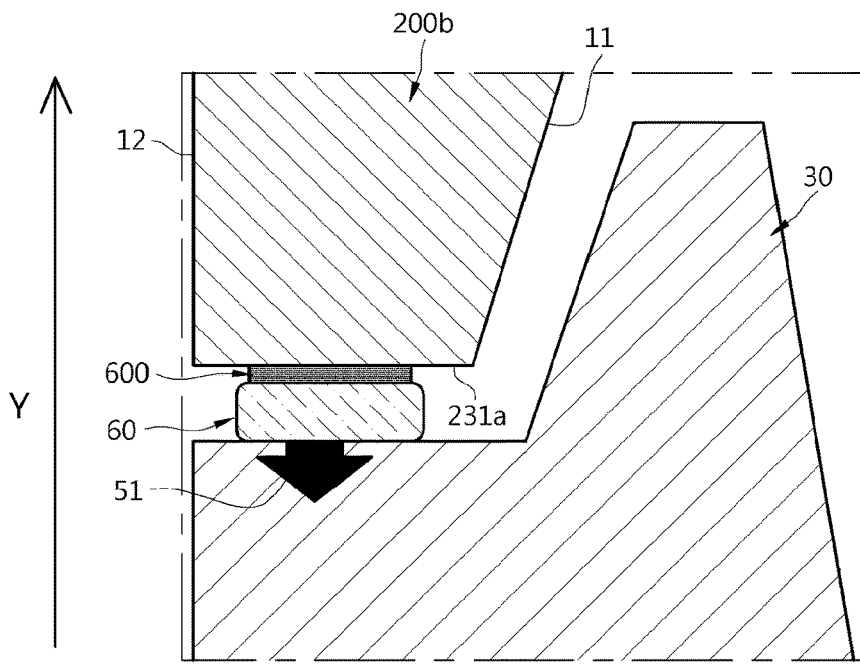

[Fig. 16a]
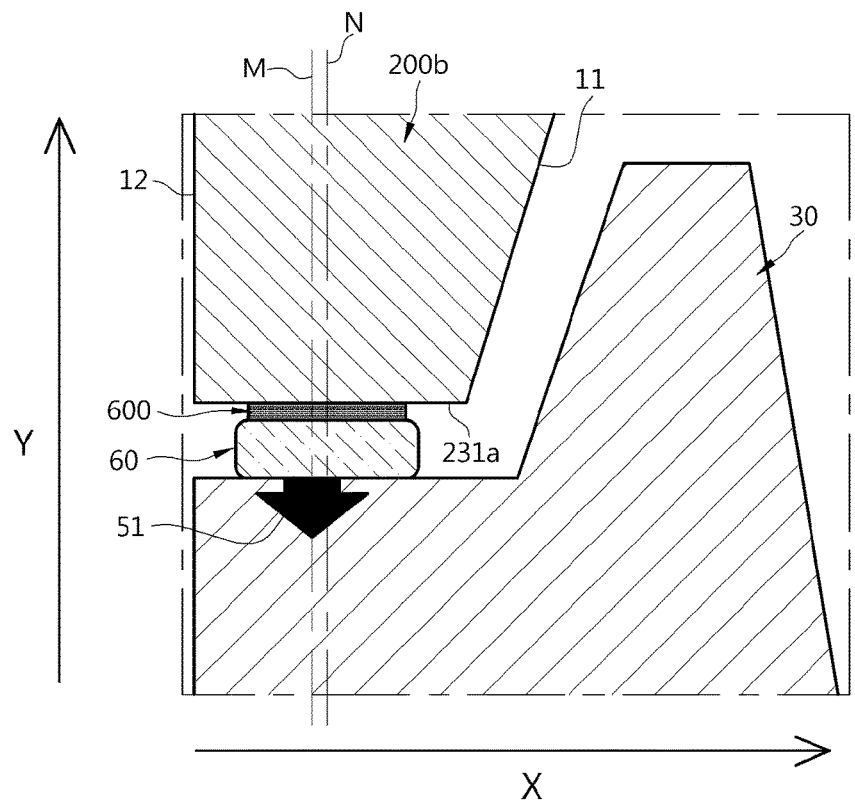
[Fig. 16b]
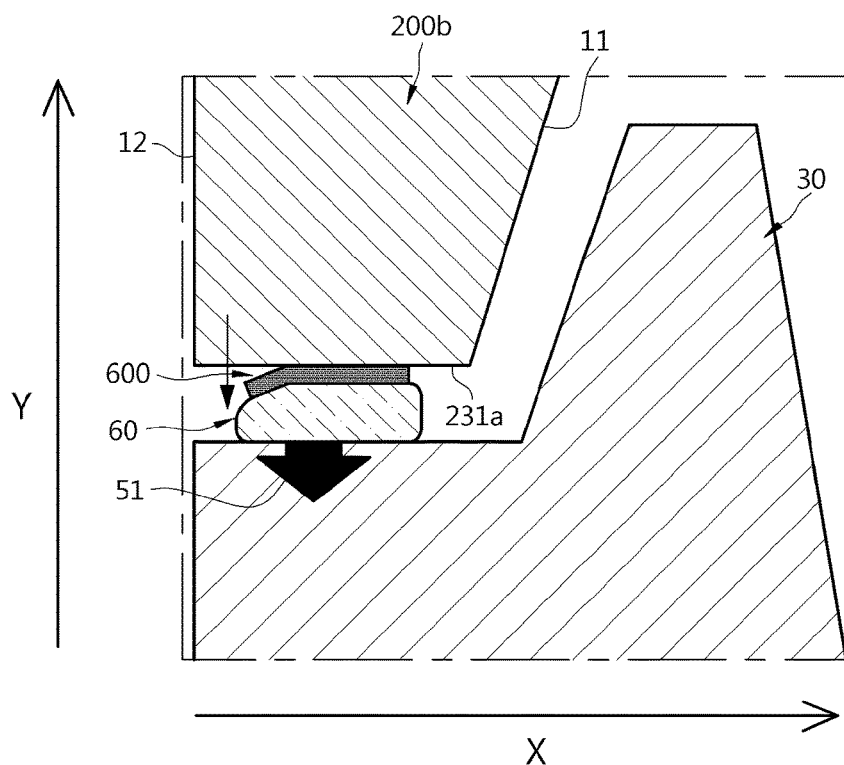

[Fig. 16c]
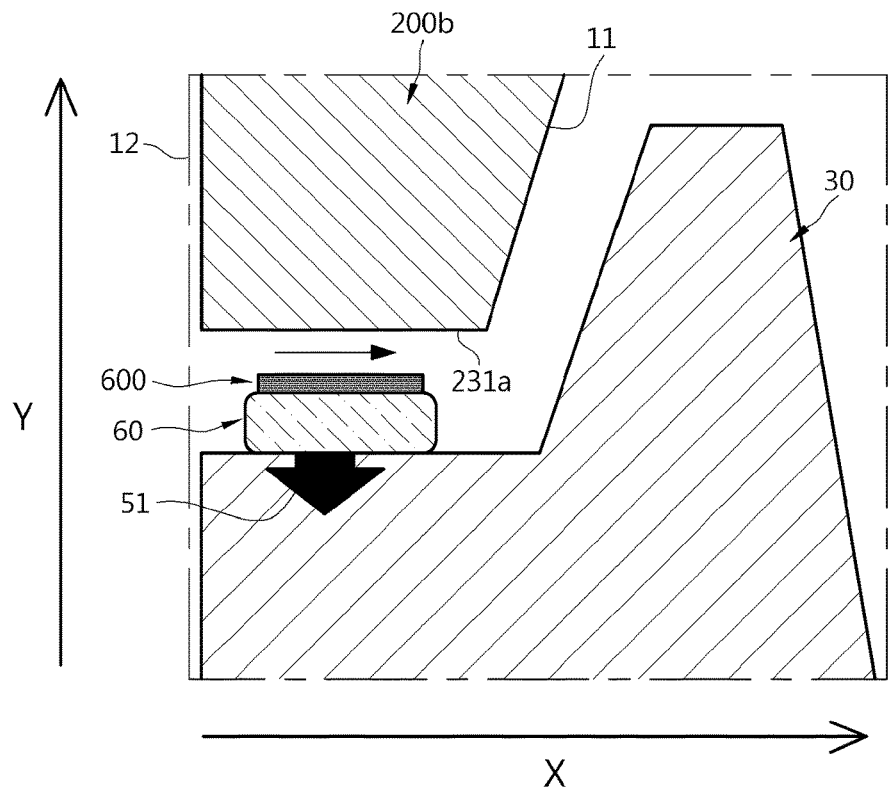
[Fig. 17a]
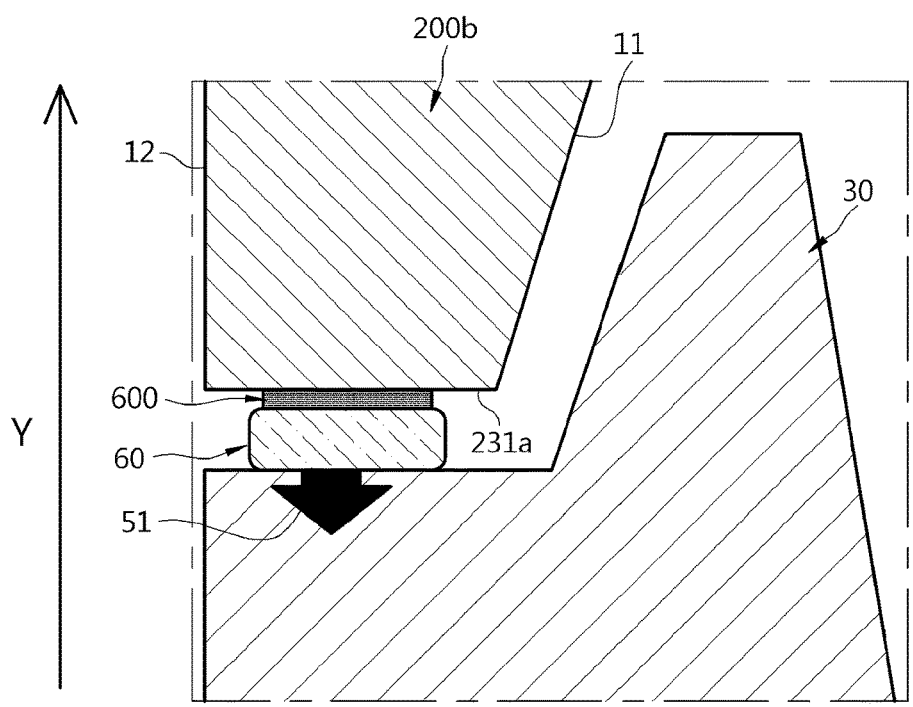

[Fig. 17b]
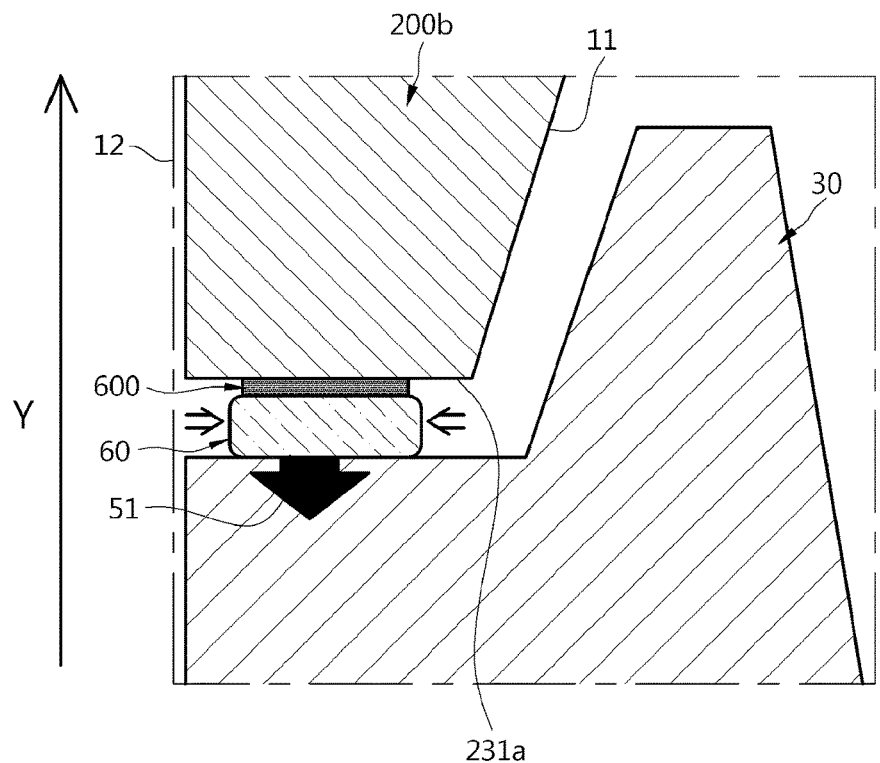
[Fig. 17c]
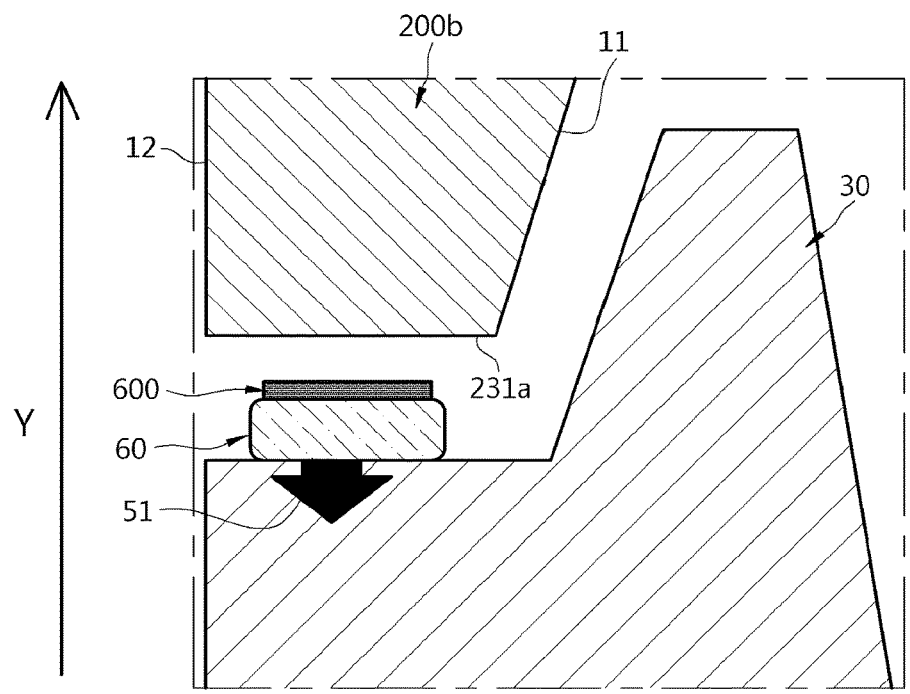

[Fig. 18a]
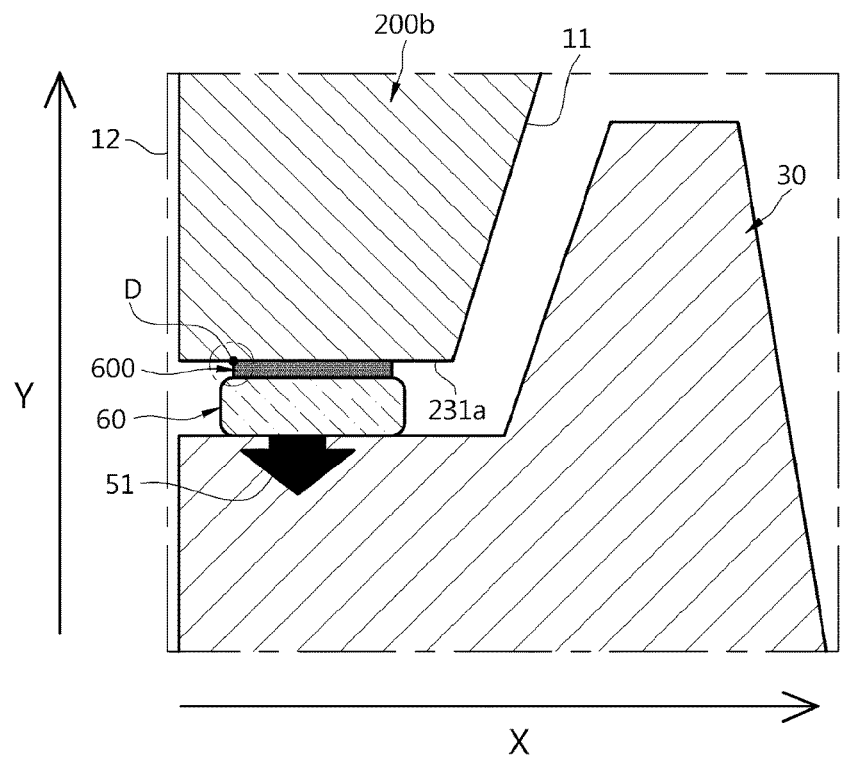
[Fig. 18b]
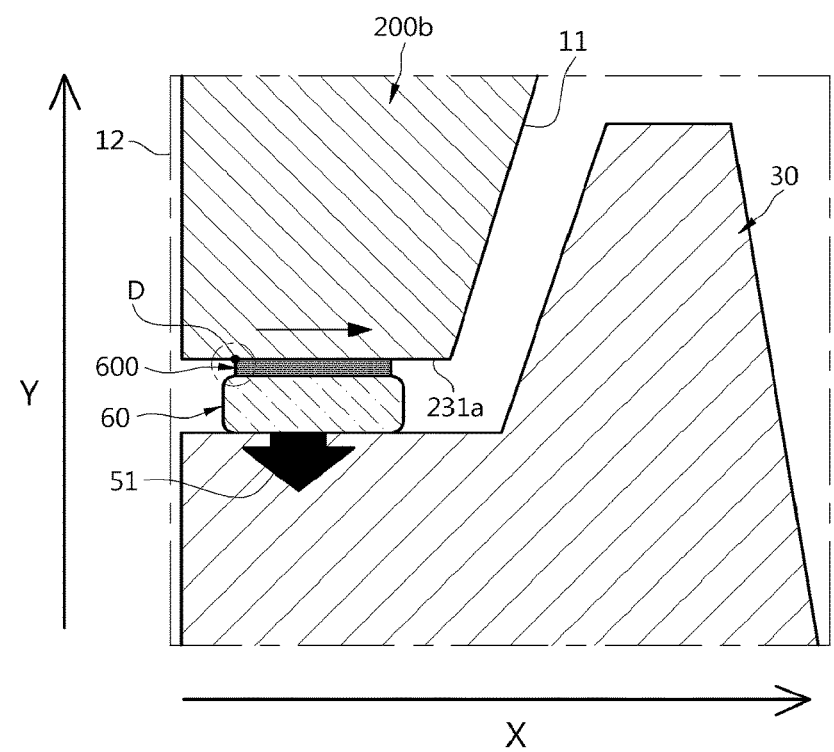

[Fig. 18c]
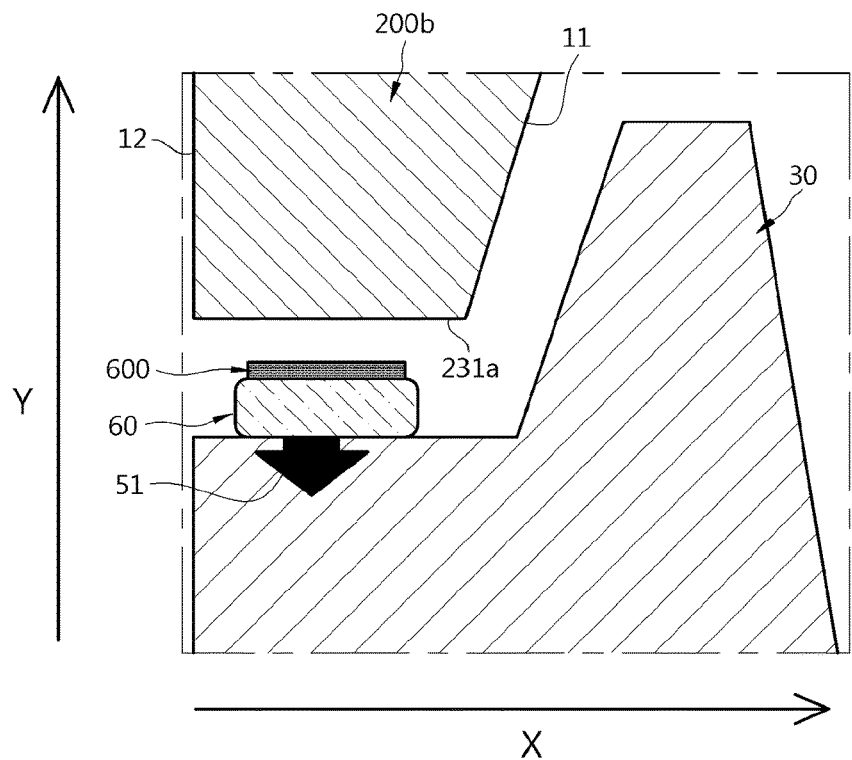
[Fig. 19]
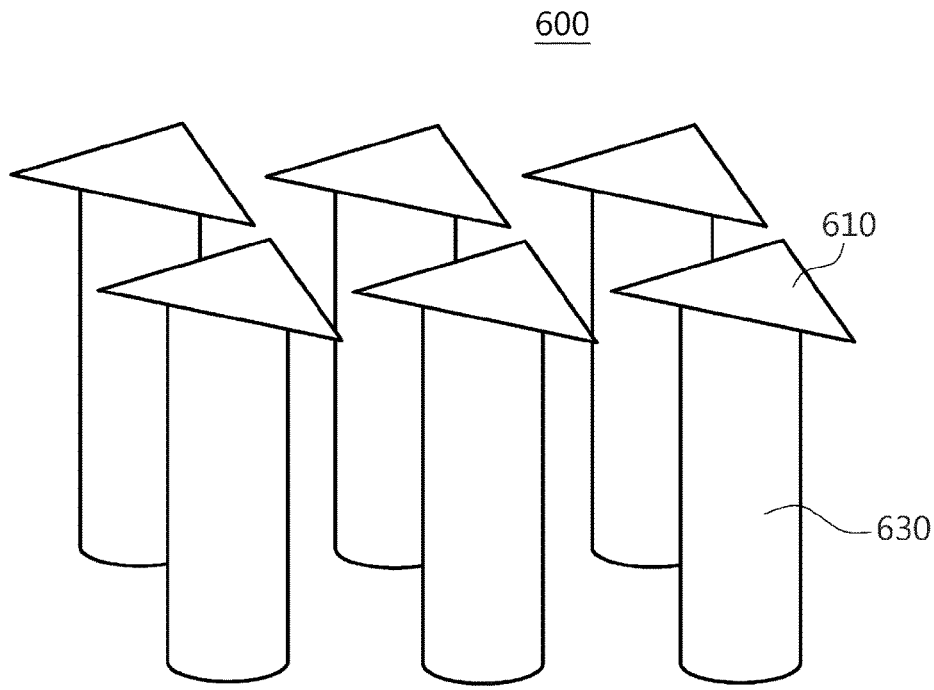

[Fig. 20]
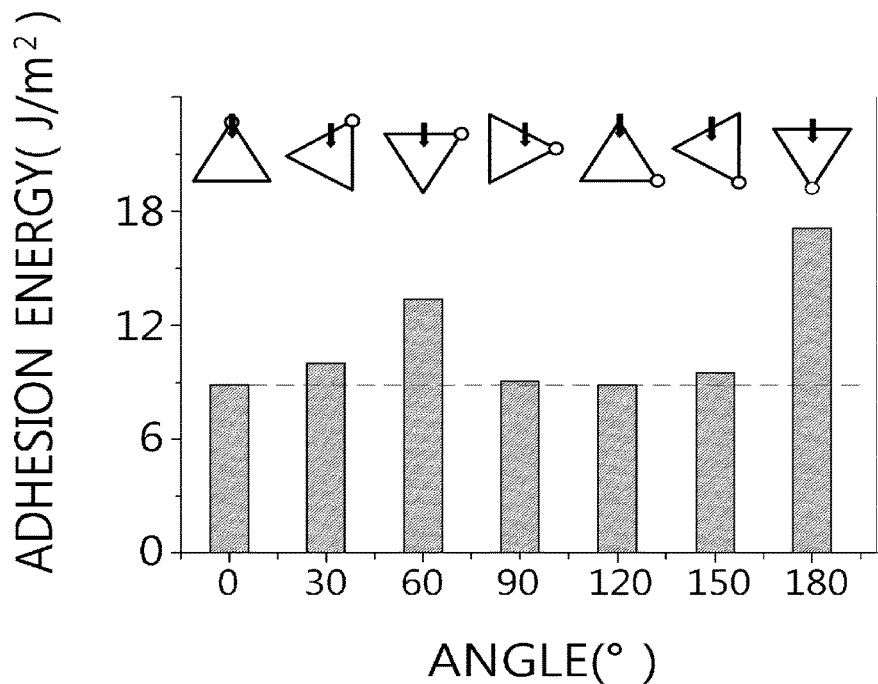
[Fig. 21a]
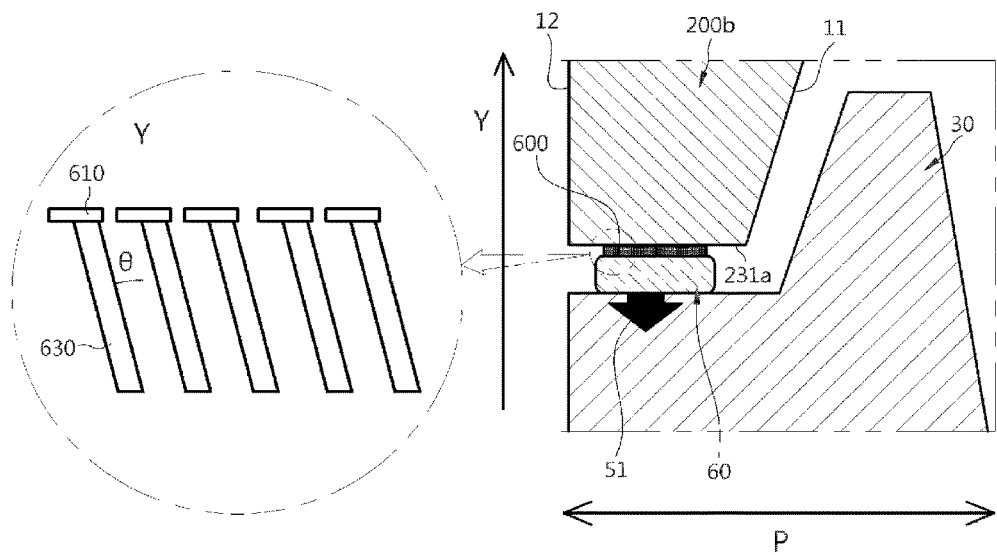

[Fig. 21b]
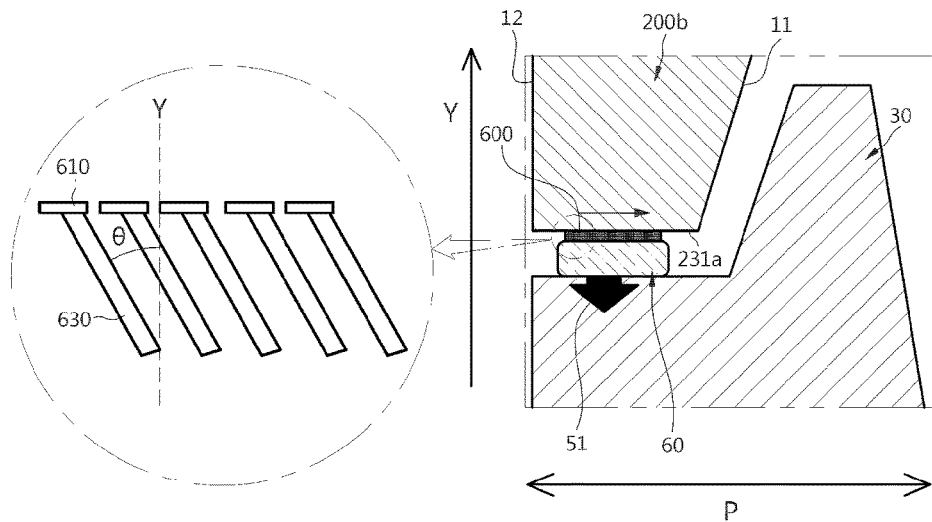
[Fig. 21c]
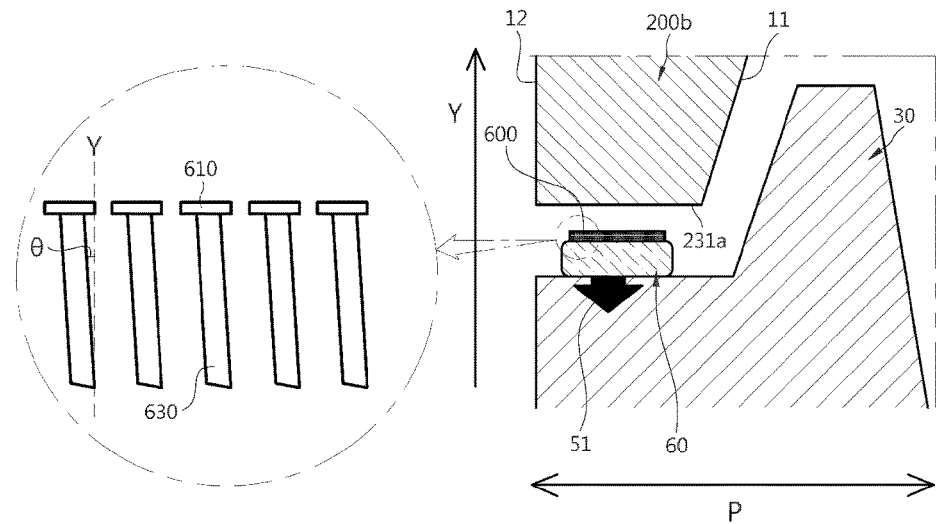

[Fig. 22]
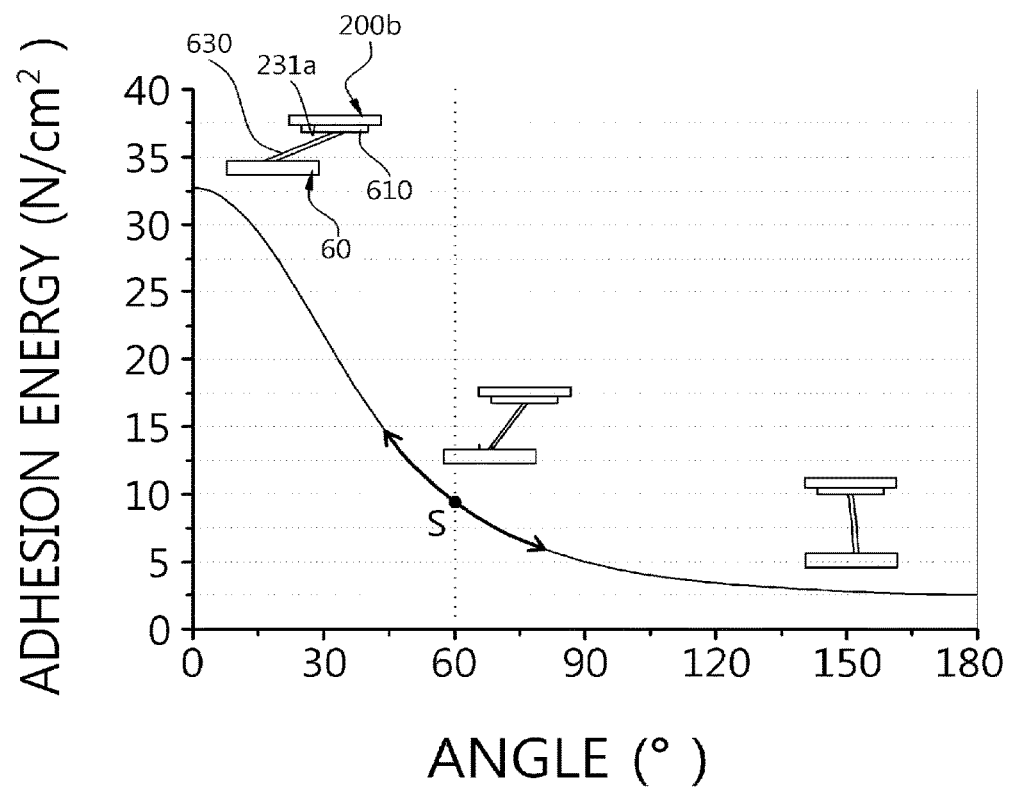

REFRIGERATOR

CROSS-REFERENCE TO RELATED APPLICATIONS

This application is a U.S. National Stage Application, which claims the benefit under 35 U.S.C. § 371 of PCT International Patent Application No. PCT/KR2015/008884, filed Aug. 25, 2015, which claims the foreign priority benefit under 35 U.S.C. § 119 of Korean Patent Application No. 10-2014-0134945, filed Oct. 7, 2014, the contents of which are incorporated herein by reference.

TECHNICAL FIELD

Embodiments of the present disclosure relate to a refrigerator, more particularly to a refrigerator having an improved structure configured to increase the energy efficiency.

BACKGROUND ART

In general, a refrigerator is a home appliance to keep foods fresh by having a body, a storage compartment formed in the body, a door configured to open or close the storage compartment, and a cool air supplying apparatus configured to supply cool air to the storage compartment.

The body of the refrigerator may include an inner case forming the storage compartment, an outer case provided in the outside of the inner case to form an exterior of the body, and an insulation material between the inner case and the outer case to insulate the storage compartment. Polyurethane is typically used as the insulation material.

After being foamed, polyurethane insulation provides sufficient rigidity and fixes the inner case to the outer case by its own adhesive force. Therefore, the majority of the refrigerators use polyurethane insulation.

Alternatively, a vacuum insulation panel is used as the insulation material, wherein the vacuum insulation panel has the excellent insulation efficiency and includes an outer material whose inside is sealed in a vacuum, and a core material provided inside of the outer material.

Recently, various attempts have been made to improve the energy efficiency of the refrigerator with the use of a heat insulating material. Particularly, various studies have been conducted to prevent the energy loss occurring at a coupling portion between a door and a body.

DISCLOSURE

Technical Problem

Therefore, it is an aspect of the present disclosure to provide a refrigerator having an improved structure to reduce the energy loss.

It is another aspect of the present disclosure to provide a refrigerator having an improved structure to effectively prevent the heat bridge effect.

It is another aspect of the present disclosure to provide a refrigerator having an improved structure to allow an inner case and an outer case to easily be connected.

It is another aspect of the present disclosure to provide a refrigerator having a structure in which the adhesion between a body and a door is improved to enhance the tightness of a storage compartment.

Technical Solution

In accordance with an aspect of the disclosure, a refrigerator may include a main body provided with an inner case and an outer case, a storage compartment formed inside of the inner case, an insulation material provided between the inner case and the outer case to insulate the storage compartment and a flange having the anisotropy having different heat resistance distribution to insulate the storage compartment, together with the insulation material.

The heat resistance of the flange may be increased as being near to the storage compartment.

In accordance with an aspect of the disclosure, a refrigerator may further include a heat radiating pipe configured to prevent a phenomenon in which dewdrops are formed in at least one of the outer case and the flange due to the difference in the temperature between the outside and the inside of the storage compartment. The heat resistance of the flange may be increased as being near to the storage compartment from the heat radiating pipe.

In accordance with an aspect of the disclosure, the refrigerator may further include a door configured to open or close an opened front surface of the storage compartment. A sealing member may be provided between the door and the flange to improve the tightness of the storage compartment.

The sealing member may be installed in the door to face the flange. The flange may include a contact surface configured to be closely contacted with the sealing member according to opening or closing of the door.

A perforated section may be formed in at least one portion of the contact surface.

An adhesive member may be provided in the sealing member to allow the sealing member to be detachably adhered to the flange.

The adhesive member may include a dry adhesive member having a ciliary shape.

The flange may include at least one of polystyrene (PS), polypropylene (PP), polyimide (PI), and carbon nanotube composite material (CNT-Composite).

The flange may include at least one chamber.

The at least one chamber may include a foam chamber filled with porous media having a lower heat transfer coefficient than air. The porous media may include at least one of polystyrene foam (PS foam) and polyurethane foam (PU foam).

A perforated section may be formed in at least one wall of the foam chamber.

The flange may include a first frame configured to face the insulation material and disposed across between the inner case and the outer case, a plurality of second frames connected to the first frame and disposed apart from each other between the inner case and the outer case and a plurality of ribs configured to connect the plurality of second frames to each other.

The first frame may include at least one disconnection portion.

In accordance with an aspect of the disclosure, the refrigerator may further include a reinforcing member provided between the flange and the outer case to improve a structural rigidity of the outer case. The reinforcing member may include a metal material.

In accordance with an aspect of the disclosure, a refrigerator may include a main body provided with an inner case and an outer case, a storage compartment formed inside of the inner case to allow a front surface thereof to be opened, a vacuum insulation panel provided between the inner case and the outer case to insulate the storage compartment and a flange coupled between the inner case and the outer case to insulate the storage compartment, together with the vacuum insulation panel, and provided with at least one chamber provided therein.

The flange may include a coupling unit configured to allow at least one end portion of the outer case and the inner case to be coupled thereto.

In accordance with an aspect of the disclosure, the refrigerator may further include a door configured to open or close the opened front surface of the storage compartment. The flange may be provided in front of the vacuum insulation panel to face the door.

The flange may include a first frame configured to face the vacuum insulation panel and disposed across between the inner case and the outer case.

The first frame may have a flat shape to correspond to the vacuum insulation panel.

The first frame is disposed discontinuously across the inner case and the outer case.

The flange may further include a plurality of second frames connected to the first frame to face the front side of the storage compartment and disposed apart from each other between the inner case and the outer case; and a third frame disposed in front of the plurality of second frames to face the door.

The flange may further include a plurality of ribs configured to connect the plurality of second frames to each other. At least one of the first frame, the plurality of second frames, the third frame and the plurality of ribs may form at least one chamber by coupling to each other.

A perforated section may be formed in at least one portion of the third frame.

The plurality of second frames may include an inner case coupling frame adjacent to the inner case to be coupled to the inner case. At least one protrusion protruding toward an outer wall of the inner case may be formed in the inner case coupling frame.

A locking unit bent toward the outside of the inner case may be formed in one end portion of the inner case toward the front side of the storage compartment. The inner case may be coupled to the inner case coupling frame such that the locking unit is fixed to the at least one protrusion.

The plurality of second frames may include an inner case coupling frame configured to face the outer wall of the inner case to be coupled to the inner case. One end portion of the inner case coupling frame may be bent about the inner case to be coupled to an inner wall of the inner case.

The plurality of second frames may include an inner case coupling frame adjacent to the inner case to be coupled to the inner case. A foam member may be coupled to the flange to be placed in front of the inner case coupling frame.

The foam member may include porous media having a lower heat transfer coefficient than air. The porous media comprises at least one of polystyrene foam (PS foam) and polyurethane foam (PU foam).

A perforated section having a plurality of holes may be formed in at least one surface of the foam member toward the front side of the storage compartment.

In accordance with an aspect of the disclosure, the refrigerator may further include a reinforcing member provided between the flange and the outer case to improve a structural rigidity of the outer case. The reinforcing member may be formed of the same as material as the outer case or a metal material.

A sealing member may be provided between the door and the flange to improve the tightness of the storage compartment. An adhesive member may be provided in the sealing member to allow the sealing member to be detachably adhered to the flange.

The adhesive member may include at least one of polyurethane (PU), polyurethane acrylate (PUA), polydimethylsiloxane (PDMS), and polyvinyl siloxane (PVS).

The flange may include a contact surface configured to be closely contacted with the sealing member according to opening or closing of the door and provided in a flat shape. The contact surface may include a plastic material.

In accordance with an aspect of the disclosure, a refrigerator may include a main body provided with an inner case and an outer case, a storage compartment formed inside of the inner case to allow a front surface thereof to be opened, a door configured to open or close the opened front surface of the storage compartment, a flange provided with a contact surface toward a front side of the storage compartment and configured to connect the inner case to the outer case and a sealing member installed in the door to improve the tightness of the storage compartment and configured to be closely contacted with the contact surface according to opening or closing of the door. An adhesive member may be provided in the sealing member to allow the sealing member to be detachably adhered to the contact surface.

The contact surface may include a plastic material.

The adhesive member may include a ciliary shape having at least one thickness unit of nanometers (nm) and a micrometer (µm).

The adhesive member may include a body fixed to the sealing member; and a head connected to the body to be detachably adhered to the contact surface.

The head may have a triangular shape having the directivity. One of vertexes of the head may be toward a separation start point of the adhesive member about the contact surface.

In a process of opening the door, the body may be inclined toward a contact direction of the adhesive member about the contact surface.

The sealing member may include a fixator fixedly coupled to the door. With respect to the contact direction of the adhesive member about the contact surface, a center line of the fixator and a center line of the adhesive member may not coincide with each other.

In accordance with an aspect of the disclosure, the refrigerator may further include at least one guide disposed adjacent to the sealing member to allow the adhesive member to be easily accessed to and closely contacted with the contract surface.

Advantageous Effects

In accordance with one aspect of the present disclosure, it may be possible to effectively reduce the energy loss by using the anisotropic flange in which a heat resistance distribution is different.

It may be possible to reduce an amount of heat transfer between an outside and an inside of a storage compartment by forming at least one chamber inside of the flange.

It may be possible to improve the performance of the insulation of a refrigerator by forming a perforated section on a contact surface of the flange.

It may be possible to prevent the heat bridge effect by using a flange having a non-metallic material.

It may be possible to allow a coupling between the inner case and the outer case to be easily performed by forming a coupling unit, to which at least one of the inner case and the outer case is coupled, in the flange.

It may be possible to improve the structural rigidity of the outer case by installing a reinforcing member.

It may be possible to improve the adhesion capability of the sealing member against the contact surface by providing a dry adhesive member in the sealing member.

It may be possible to reduce an area of metal portion in the flange by providing the dry adhesive member, instead of a magnet, for coupling between the sealing member and the flange, and thus it may be possible to prevent the heat bridge effect generated in the metal portion of the flange.

DESCRIPTION OF DRAWINGS

These and/or other aspects of the present disclosure will become apparent and more readily appreciated from the following description of the embodiments, taken in conjunction with the accompanying drawings of which:

FIG. 1 is a perspective view illustrating an exterior of a refrigerator in accordance with one embodiment of the present disclosure.

FIG. 2 is an exploded perspective view illustrating the refrigerator in accordance with an embodiment of the present disclosure.

FIG. 3 is a perspective view illustrating an insulation assembly disposed between an inner case and an outer case in the refrigerator in accordance with one embodiment of the present disclosure.

FIG. 4 is a cross-sectional view illustrating a flange according to a first embodiment in the refrigerator in accordance with one embodiment of the present disclosure.

FIG. 5 is a cross-sectional view illustrating a flange according to a second embodiment in the refrigerator in accordance with one embodiment of the present disclosure.

FIG. 6 is a cross-sectional view illustrating a flange according to a third embodiment in the refrigerator in accordance with one embodiment of the present disclosure.

FIG. 7 is a cross-sectional view illustrating a flange according to a fourth embodiment in the refrigerator in accordance with one embodiment of the present disclosure.

FIG. 8 is a cross-sectional view illustrating a flange according to a fifth embodiment in the refrigerator in accordance with one embodiment of the present disclosure.

FIG. 9 is a cross-sectional view illustrating a flange according to a sixth embodiment in the refrigerator in accordance with one embodiment of the present disclosure.

FIGS. 10A and 10B are cross-sectional views illustrating a coupling structure between the flange and the door in the refrigerator in accordance with one embodiment of the present disclosure.

FIG. 11 is a cross-sectional view illustrating a structure between a door and a flange in the refrigerator in accordance with another embodiment of the present disclosure.

FIG. 12 is an enlarged view illustrating an adhesive member in accordance with a first embodiment of FIG. 11.

FIG. 13 is a view illustrating an adhesive member in accordance with a second embodiment, in the refrigerator in accordance with another embodiment of the present disclosure.

FIG. 14 is a cross-sectional view illustrating a structure between a door to which a guide is added, and a flange in the refrigerator in accordance with another embodiment of the present disclosure.

FIGS. 15A to 15C are views illustrating a modification process of the adhesive member according to opening or closing of the door in the refrigerator in accordance with another embodiment.

FIGS. 16A to 16C are views illustrating a first opening process of the door in the refrigerator in accordance with another embodiment.

FIGS. 17A to 17C are views illustrating a second opening process of the door in the refrigerator in accordance with another embodiment.

FIGS. 18A to 18C are views illustrating a third opening process of the door in the refrigerator in accordance with another embodiment.

FIG. 19 is an enlarged view illustrating the adhesive member of FIGS. 18A to 18C.

FIG. 20 is a graph illustrating the difference in the adhesion energy according to position of the head in the adhesive of FIG. 19.

FIGS. 21A to 21C are views illustrating a fourth opening process of the door in the refrigerator in accordance with another embodiment.

FIG. 22 is a graph illustrating the difference in the adhesion energy according to an inclination of the body in the adhesive of FIGS. 21A to 21C.

BEST MODE

Hereinafter embodiments of the present disclosure will be described with reference to drawings. In the following detailed description, the terms of "front end", "rear end", "upper portion", "lower portion", "upper end", "lower end" and the like may be defined by the drawings, but the shape and the location of the component is not limited by the term.

FIG. 1 is a perspective view illustrating an exterior of a refrigerator in accordance with one embodiment of the present disclosure, and FIG. 2 is an exploded perspective view illustrating the refrigerator in accordance with an embodiment of the present disclosure. FIG. 3 is a perspective view illustrating an insulation assembly disposed between an inner case and an outer case in the refrigerator in accordance with one embodiment of the present disclosure.

As illustrated in FIGS. 1 to 3, a refrigerator 1 may include a main body 10 having a storage compartment 20 provided therein.

The main body 10 may have an approximately box shape. The main body 10 may include an inner case 11 and an outer case 12 provided outside the inner case 11. Particularly, the storage compartment 20 may be formed inside the inner case 11. In addition, the outer appearance of the refrigerator 1 may be determined by the shape of the outer case 12. The outer case 12 and the inner case 11 may be formed of different materials. As an example, the outer case 12 may be formed of a metal material for the durability. In addition, the inner case 11 may be formed of a resin material for the heat insulating properties and ease of manufacture. The outer case 12 may be formed of steel, and the inner case 11 may be formed of an acrylonitrile-butadiene-styrene copolymer (ABS resin). However, the material of the outer case 12 and the inner case 11 is not limited thereto.

The storage compartment 20 may have an opened front surface so that foods are inserted thereto or withdrawn therefrom. The storage compartment 20 may be divided into the left side and the right side by a partition wall 17. A refrigerating compartment 21 may be provided in the right side of the main body 10 and a freezing compartment 22 may be provided in the left side of the main body 10. However, the position of the refrigerating compartment 21 and the freezing compartment 22 is not limited thereto, and thus various modifications are possible.

A plurality of shelves (not shown) may be provided in the storage compartment 20 and thus the plurality of shelves (not shown) may divide the storage compartment 20 into multiple spaces. In an upper portion of the shelf, goods, e.g., foods may be stacked. In the storage compartment 20, a plurality of storage box (not shown) may be provided to be inserted thereinto and withdrawn therefrom in a slide manner.

The main body 10 may further include a cool air supplying apparatus configured to supply cool air to the storage compartment 20. The cold air supplying apparatus may include a compressor (not shown), a condenser (not shown), an expansion valve (not shown), an evaporator (not shown), and a blower fan (not shown).

The refrigerator 1 may further include a door 30. The door 30 may be provided to open or close the opened front surface of the storage compartment 20. The refrigerating compartment 21 and the freezing compartment 22 may be opened and closed by a refrigerating compartment door 31 and a freezing compartment door 33 which are rotatably coupled to the main body 10, respectively. A plurality of door guards (not shown) may be provided on a rear surface of the refrigerator compartment door 31 and the freezer compartment door 33 to accommodate foods or the like.

In the door 30, a handle 35 may be provided to facilitate the user's grip.

The refrigerator 1 may further include a hinge module 40 to allow the door 30 to be rotatably coupled to the main body 10. The hinge module 40 may include an upper hinge 41 and a lower hinge 43.

The refrigerator 1 may further include an insulation material 110 provided between the inner case 11 and the outer case 12 to insulate the storage compartment 20. In other words, an insulation assembly 100 may be provided between the inner case 11 and the outer case 12 of the main body 10 to prevent the cool air of the storage compartment 20 from being leaked.

The insulation assembly 100 may include an insulation material 110 and a case 120.

The insulation material 110 may include a vacuum insulation panel (VIP). The vacuum insulation panel may include a core material and an outer material. The core material may be provided inside the outer material. The outer material may seal the core material so that the core material is maintained in a vacuum state. The core material may be formed of fumed silica or glass fiber having good durability and low thermal conductivity, but is not limited thereto. The outer material may be formed of an aluminum foil having the low gas and moisture permeability or a deposition material on which metal and inorganic materials are deposited, but is not limited thereto. The vacuum insulation panel may further include a getter configured to maintain the inside of the outer material in the vacuum state for a long period of time by adsorbing the gas and moisture in the outer material. Caustic soda (CaO) may be used as the getter, but is not limited thereto.

The case 120 may be provided inside of the outer case 12 to reinforce the strength of the outer case 12. The case 120 may be coupled to the inner surface of the outer case 12. The case 120 and the outer case 12 may be firmly coupled to each other through a fastening member, e.g., a separate screw. However, the manner of coupling of the case 120 and the outer case 12 is not limited thereto. In addition, the case 120 may protect the insulation material 110 from external impacts by accommodating the insulation material 110 therein. The case 120 may be disposed to face the inner surface of the outer case 12. The insulation material 110 may be provided to face an outer surface of the inner case 11. In other words, in a direction (X) from the outer case 12 to the inner case 11 of the main body 10, the outer case 12, the case 120, the insulation material 110 and the inner case 11 may be arranged in order.

The case 120 may include at least one of steel and stainless steel (SUS). Alternatively, the case 120 may include at least one of polycarbonate (PC), polystyrene (PS), and polyphenylene sulfide (PPS). In other words, the case 120 may include at least one of metal and plastic.

The insulation assembly 100 may be also provided inside of the partition wall 17 configured to divide the storage compartment 20 into the refrigerating compartment 21 and the freezing compartment 22. In other words, the insulation assembly 100 may also be provided between the inner cases 11 forming the partition walls 17. Particularly, the insulation material 110 may be disposed inside the partition wall 17 toward the freezing compartment 22. The case 120 may be disposed inside the partition wall 17 toward the refrigerating compartment 21. However, the arrangement structure of the insulation assembly 100 is not limited thereto, and thus various modifications are possible.

The insulation assembly 100 may be provided inside of the door 30.

The refrigerator 1 may further include a sealing member 50.

The sealing member 50 may be provided between the door 30 and the main body 10 to prevent the cool air of the storage compartment 20 from being discharged to the outside. In other words, the sealing member 50 may be provided between the door 30 and a flange 200 to improve the tightness of the storage compartment 20.

The sealing member 50 may be installed in the door 30 to face the flange 200. That is, the sealing member 50 may be installed on the rear surface of the door 30. The sealing member 50 may be provided along the edge of the door 30 to face the flange 200.

The sealing member 50 may have an elastic material excellent in adhesion. As an example, the sealing member 50 may have a rubber material.

FIG. 4 is a cross-sectional view illustrating a flange according to a first embodiment in the refrigerator in accordance with one embodiment of the present disclosure. Hereinafter reference numerals not shown are referred to FIGS. 1 to 3. A third frame 230 may be the same as a contact surface 231 or may be used to encompass the contact surface 231.

As illustrated in FIG. 4, the refrigerator 1 may further include the flange 200 (refer to FIG. 4).

Together with the insulation material 110, the flange 200 may be configured to insulate the storage compartment 20.

The flange 200 may be provided between the inner case 11 and the outer case 12. Particularly, the flange 200 may be provided between the inner case 11 and the outer case 12 to face the front side of the storage compartment 20.

The flange 200 may connect the outer case 12 to the inner case 11.

The flange 200 may be coupled to between the outer case 12 and the inner case 11. Particularly, the flange 200 may be detachably coupled to between the outer case 12 and the inner case 11.

The flange 200 may be disposed in the front side of the insulation assembly 100. In other words, the flange 200 may be located in the front side of the insulation material 110 to face the door 30.

The flange 200 may have the anisotropy in which the thermal resistance distribution is different, to prevent the heat bridge effect. The heat bridge effect may represent a phenomenon in which heat is transferred toward the storage compartment 20 along the edge of the main body 10, i.e., at least one edge of the inner case 11 and the outer case 12. By using the anisotropic flange 200 having the different heat resistance distribution, it is possible to prevent the heat bridge effect, thereby reducing the energy loss of the refrigerator 1. Particularly, the energy loss through a contact area between the sealing member 50 and the flange 200, may be significantly reduced.

Thermal resistance of the flange 200 may be increased as being near to the storage compartment 20. In other words, the thermal resistance of the flange 200 may be increased in the direction (X) from the outer case 12 to the inner case 11 of the main body 10. Generally, since the temperature of the outside of the storage compartment 20 is higher than the temperature of the inside of the storage compartment 20, the heat may move in the direction (X) from the outer case 12 to the inner case 11 of the main body 10. Therefore, it may be possible to effectively reduce the heat transfer toward the storage compartment 20 by designing the flange 200 to increase the thermal resistance of the flange 200 in the direction (X) from the outer case 12 to the inner case 11 of the main body 10.

The refrigerator 1 may further include a heat radiating pipe 500.

The heat radiating pipe 500 may be disposed to prevent a phenomenon in which dewdrops are formed in at least one of the outer case 12 and the flange 200 due to the difference in the temperature between the outside and the inside of the storage compartment 20.

The heat radiating pipe 500 may be disposed between the outer case 12 and the inner case 11 of the main body 10.

The heat radiating pipe 500 may be disposed between the outer case 12 and the inner case 11 of the main body 10 to be adjacent to the outer case 12.

The heat radiating pipe 500 may be disposed between the outer case 12 and the flange 200.

The heat radiating pipe 500 may be disposed between a reinforcing member 400 and the flange 200.

The heat radiating pipe 500 may be disposed inside of the flange 200.

The thermal resistance of the flange 200 may be increased from the heat radiating pipe 500 toward the storage compartment 20. In other words, the thermal resistance of the flange 200 may be increased from the heat radiating pipe 500 having a relatively high temperature toward the storage compartment 20 having a relatively low temperature. As mentioned above, it may be possible to effectively reduce the heat transfer and the energy transfer toward the storage compartment 20 by designing the flange 200 to increase the thermal resistance of the flange 200 from the heat radiating pipe 500 to the storage compartment 20.

The heat radiating pipe 500 may be disposed inside of the partition wall 17 to prevent a phenomenon in which dewdrops are formed in the partition wall 17 due to the difference in the temperature between the freezing compartment 22 and the refrigerating compartment 21.

The flange 200 may include a contact surface 231.

The contact surface 231 may be provided in the front surface of the flange 200. The contact surface 231 may be provided on the front surface of the flange 200 to be closely contacted with the sealing member 50 according to opening or closing of the door 30.

At least one portion of the contact surface 231 may be formed with a perforated section 250. Particularly, the perforated section 250 may be formed on the contact surface 231 to be adjacent to the storage compartment 20. The perforated section 250 may have a plurality of fine holes 251.

The perforated section 250 may increase the thermal resistance of the contact surface 231, thereby reducing the energy loss through the contact surface 231. That is, the perforated section 250 may reduce the heat transfer toward the storage compartment 20 by making the heat transfer through the contact surface 231 difficult.

The perforated section 250 may have the same material as at least one of the flange 200 and a foam member 300.

The flange 200 may include a frame 210, 220 and 230.

The frame 210, 220 and 230 may include a first frame 210, a plurality of second frames 220 and a third frame 230.

The first frame 210 may be disposed to face the insulation material 110, and to cross the inner case 11 and the outer case 12. The first frame 210 may be disposed behind at least one of the heat radiating pipe 500 and the reinforcing member 400. The first frame 210 may be disposed between the insulation material 110 and at least one of the heat radiating pipe 500 and the reinforcing member 400.

The first frame 210 may have a flat shape to correspond to the insulation material 110. Particularly, the first frame 210 may have a flat shape to correspond to a shape of the vacuum insulation panel provided between the inner case 11 and the outer case 12 of the main body 10.

The plurality of second frames 220 may be arranged apart from each other between the inner case 11 and the outer case 12 of the main body 10. The plurality of second frames 220 may be connected to the first frame 210 to face the front side of the storage compartment 20. The plurality of second frames 220 may be provided between the first frame 210 and the third frame 230.

The third frame 230 may be arranged in front of the plurality of second frames 220 to face the door 30. As described above, the third frame 230 may be the same as the contact surface 231, or may be used to encompass the contact surface 231. However, for convenience of description, the contact surface 231 is defined as a portion formed in the front surface of the third frame 230 to be closely contacted with the sealing member 50.

The perforated section 250 may be formed in at least one portion of the third frame 230. In another aspect, as described above, the perforated section 250 may be formed in at least one portion of the contact surface 231.

The flange 200 may further include a plurality of ribs 240. The plurality of ribs 240 may connect the plurality of second frames 220 to each other. Particularly, the plurality of ribs 240 may connect the plurality of second frames 220 to each other in the direction (X) from the outer case 12 to the inner case 11 of the main body 10.

A thickness of the frame 210, 220 and 230 may be different from a thickness of the plurality of ribs 240. In other words, the thickness of at least one of the first frame 210, the plurality of second frames 220, the third frame 230, and the plurality of ribs 240 may be different from each other.

The plurality of second frames 220 may be disposed between the heat radiating pipe 500 and the inner case 11.

The plurality of second frames 220 may be apart from each other in the direction (X) from the outer case 12 to the inner case 11 of the main body 10 to surround a part of the heat radiating pipe 500.

The plurality of second frames 220 may include a curved surface. Particularly, the plurality of second frames 220 may have a shape that is convex in the direction (X) from the outer case 12 to the inner case 11 of the main body 10.

The plurality of second frames 220 may have a different curvature from each other, but is not limited thereto.

The flange 200 may further include at least one chamber 260.

The at least one chamber 260 may be formed by at least one coupling of the first frame 210, the plurality of second frames 220, the third frame 230, and the plurality of ribs 240.

The at least one chamber 260 may have a variety of volumes.

Therefore, the flange 200 may perform a function of interfering or preventing the heat transfer in the direction (X) from the outer case 12 to the inner case 11 of the main body 10 by having a structure having the frame 210, 220 and 230, and the ribs 240, and the at least one chamber 260.

The at least one chamber 260 may include a foam chamber 261.

The foam chamber 261 may be formed adjacent to the inner case 11 of the main body 10.

The perforated section 250 may be formed in at least one wall of the foam chamber 261. In another respects, at least one wall of the foam chamber 261 may be formed with the third frame 230 having the perforated section 250.

The inside of the foam chamber 261 may be filled with air.

The flange 200 may include a material having a low heat transfer coefficient. As an example, the flange 200 may include at least one of polystyrene (PS), polypropylene (PP), polyimide (PI), and carbon nanotube composite material (CNT-Composite).

The refrigerator 1 may further include the reinforcing member 400.

The reinforcing member 400 may be provided adjacent to the outer case 12 to enhance the structural rigidity of the outer case 12.

The reinforcing member 400 may be provided between the flange 200 and the outer case 12.

The reinforcing member 400 may be provided between the heat radiating pipe 500 and the outer case 12.

The reinforcing member 400 may be formed of the same material as the outer case 12. Alternatively, the reinforcing member 400 may be formed of a metal material. As an example, the reinforcing member 400 may be formed of steel.

The inner case 11 of the main body 10 may be coupled to the flange 200. Particularly, the plurality of second frames 220 may include an inner case coupling frame 221 adjacent to the inner case 11 to be coupled to the inner case 11. At least one protrusion 222 protruding toward the outer wall of the inner case 11 may be formed in the inner case coupling frame 221. A locking unit 11a may be formed in one end portion of the inner case 11. Particularly, the locking unit 11a bent toward the outside of the inner case 11, may be formed in one end portion of the inner case 11 toward the front side of the storage compartment 20. The inner case 11 may be coupled to the inner case coupling frame 221 such that the locking unit 11a is locked to or fixed to the at least protrusion 222.

The inner case coupling frame 221 may face the outer wall of the inner case 11 to be coupled to the inner case 11. One end portion of the inner case coupling frame 221 may be bent with respect to the inner case 11 to be coupled to the inner wall of the inner case 11.

In another aspect, any one of the plurality of second frames 220 adjacent to the inner case 11 may be bent to form an inner case coupling groove 223 in which the inner case 11 is accommodated. At least one protrusion 222 protruding toward the inside of the inner case coupling groove 223 may be formed in one inner wall of the inner case coupling groove 223. The inner case 11 may be coupled to the inner case coupling groove 223 by fixing the locking unit 11a formed in one portion of the inner case 11, to the at least one protrusion 222.

FIG. 5 is a cross-sectional view illustrating a flange according to a second embodiment in the refrigerator in accordance with one embodiment of the present disclosure. Hereinafter reference numerals not shown are referred to FIGS. 1 to 3. A description of the same parts as those shown in FIG. 4 will be omitted.

As illustrated in FIG. 5, the foam chamber 261 may be filled with the foam member 300.

The foam member 300 may include a material having a low heat transfer coefficient.

The foam member 300 may include porous media having a lower heat transfer coefficient than air. For an example, the porous media may include at least one of polystyrene foam (PS foam) and polyurethane foam (PU foam).

The foam member 300 may be provided inside of the foam chamber 261 using the insert molding. Particularly, the foam member 300 may be inserted in an extrusion molding process of the flange 200 including the foam chamber 261.

The foam member 300 may be integrally molded with the flange 200. The foam member 300 may be integrally molded with the flange 200 through the insert molding.

The first frame 210 of the flange 200 facing the insulation material 110 may include at least one disconnection portion 211. In other words, the first frame 210 of the flange 200 may be disposed discontinuously across the inner case 11 and the outer case 12 of the main body 10. Accordingly, the amount of the heat transfer in the direction (X) from the outer case 12 to the inner case 11 of the main body 10 may be reduced by forming at least one disconnection portion 211 in the first frame 210 of the flange 200. That is, the heat flow moving in the direction (X) from the outer case 12 to the inner case 11 of the main body 10 along the first frame 210 of the flange 200 from the outside of the storage compartment 20, may be prevented by at least one disconnection portion 211 formed in the first frame 210.

FIG. 6 is a cross-sectional view illustrating a flange according to a third embodiment in the refrigerator in accordance with one embodiment of the present disclosure. Hereinafter reference numerals not shown are referred to FIGS. 1 to 3. A description of the same parts as those shown in FIG. 4 will be omitted.

As illustrated in FIG. 6, the foam member 300 may be coupled to the flange 200.

The foam member 300 may be detachably coupled to the flange 200.

The foam member 300 may be coupled to the flange 200 to be adjacent to the inner case 11 in the direction (X) from the outer case 12 to the inner case 11 of the main body 10.

The foam member 300 may be coupled to the flange 200 to be placed in front of the inner case coupling frame 221.

The foam member 300 may be coupled to a foam member fixator 310 formed in the flange 200. The foam member fixator 310 may have a shape recessed toward the rear side of the storage compartment 20. The foam member fixator 310 may have one surface that is opened toward the front side of the storage compartment 20 so that the foam member fixator 310 is coupled to the foam member 300. The inner case coupling frame 221 may form one wall of the foam member fixator 310. The foam member fixator 310 may be formed by coupling any one of the inner case coupling frame 221, the first frame 210 connected to the inner case coupling frame 221, and the plurality of second frames 220 adjacent to the inner case coupling frame 221.

The foam member 300 may include a material having a low heat transfer coefficient. For an example, the foam member 300 may include at least one of polystyrene foam (PS foam) and polyurethane foam (PU foam).

The first frame 210 of the flange 200 facing the insulation material 110 may include at least one disconnection portion 211. In other words, the frame first 210 of the flange 200 may be disposed discontinuously across the inner case 11 and the outer case 12 of the main body 10. Accordingly, the amount of the heat transfer in the direction (X) from the outer case 12 to the inner case 11 of the main body 10 may be reduced by forming the at least one disconnection portion 211 in the first frame 210 of the flange 200.

The perforated section 250 having a plurality of holes 251 (refer to FIG. 4) may be formed in at least one surface of the foam member 300 toward the front side of the storage compartment 20.

FIGS. 7 to 9 are views illustrating a coupling structure of the inner case 11 and the outer case 12 of the main body 10, and a flange 200a in details. The coupling structure illustrated in FIGS. 7 to 9 is any one of embodiments and thus the coupling structure of the inner case 11 and the outer case 12 of the main body 10, and the flange 200a may be variously modified.

FIG. 7 is a cross-sectional view illustrating a flange according to a fourth embodiment in the refrigerator in accordance with one embodiment of the present disclosure. Hereinafter reference numerals not shown are referred to FIGS. 1 to 3. A description of the same parts as those shown in FIG. 4 will be omitted.

As illustrated in FIG. 7, the flange 200a may be provided between the outer case 12 and the inner case 11 of the main body 10 to connect the outer case 12 to the inner case 11 of the main body 10.

The flange 200a may be detachably coupled to between the outer case 12 and the inner case 11.

The flange 200a may be located in front of the insulation material 110 to face the door 30.

A space between the inner case 11 and the outer case 12 of the main body 10 may be divided by a cartridge 270. According to another aspect, the insulation material 110 and the flange 200a may be separated by the cartridge 270. That is, the cartridge 270 may be disposed between the insulation material 110 and the flange 200a. The insulation material 110 may be disposed in the rear side of the cartridge 270, and the flange 200a may be disposed in the front side of the cartridge 270.

The flange 200a may include a wall 280.

The wall 280 may include a first wall 281, a second wall 282, a third wall 283 and a fourth wall 284.

The first wall 281 may be disposed to face the cartridge 270 and to cross between the inner case 11 and the outer case 12. The first wall 281 may have a flat shape to correspond to the insulation material 110 or the cartridge 270.

The first wall 281 may include a wing 285. The wing 285 may extend from the first wall 281 toward the outer case 12 of the main body 10. The second wall 282 described later may be connected to the first wall 281 to be closer to the inner case 11 than the wing 285 in the direction (X) from the outer case 12 to the inner case 11 of the main body 10.

The second wall 282 may be disposed adjacent to the outer case 12 of the main body 10.

The second wall 282 may be arranged to face the inner wall of the inner case 12.

The second wall 282 may be disposed to face the reinforcing member 400.

The second wall 282 may be connected to the first wall 281 to face the front side of the storage compartment 20. The second wall 282 may be provided between the first wall 281 and the fourth wall 284. The second wall 282 may connect the first wall 281 to the fourth wall 284.

The third wall 283 may be disposed apart from the second wall 282 between the inner case 11 and the outer case 12 of the main body 10.

The third wall 283 may be disposed adjacent to the inner case 11 of the main body 10.

The third wall 283 may be disposed to face the outer wall of the inner case 12.

The third wall 283 may be connected to the first wall 281 to face the front side of the storage compartment 20. The third wall 283 may be provided between the first wall 281 and the fourth wall 284. The third wall 283 may connect the first wall 281 to the fourth wall 284.

The fourth wall 284 may be disposed toward the front side of the storage compartment 20.

The fourth wall 284 may be disposed to face the door 30.

The fourth wall 284 may be disposed cross between the inner case 11 and the outer case 12 of the main body 10.

The perforated section 250 may be formed in at least one portion of the fourth wall 284. The perforated section 250 may reduce the energy loss through the fourth wall 284 by increasing the thermal resistance of the fourth wall 284.

The first wall 281, the second wall 282, the third wall 283 and the fourth wall 284 may form a closed curve by coupling to each other.

The flange 200a may further include a plurality of ribs 240a.

The plurality of ribs 240a may be connected to at least one wall 280 of the flange 200a. As an example, the plurality of ribs 240a may be connected to at least one of the second wall 282 and the third wall 283 which face each other. The plurality of ribs 240a may be connected to at least one of the second wall 282 and third wall 283 to cross to each other. The plurality of ribs 240a may be connected to the second wall 282 to protrude toward the inner case 11. The plurality of ribs 240a may be connected to the third wall 283 to protrude toward the outer case 12.

The plurality of ribs 240a may be arranged side by side, but is not limited thereto.

At least one chamber 260 (refer to FIG. 4) may be formed inside of the flange 200a. Particularly, the at least one chamber 260 may be formed by at least one coupling of the first wall 281, the second wall 282, the third wall 283, the fourth wall 284 and the plurality of ribs 240a.

The reinforcing member 400 may be provided adjacent to the outer case 12 to enhance the structural rigidity of the outer case 12. The reinforcing member 400 may be provided between the flange 200a and the outer case 12. Particularly, the reinforcing member 400 may be provided between the second wall 282 and the outer case 12.

The reinforcing member 400 may be disposed in front of the cartridge 270 to be apart from the cartridge 270. Between the reinforcing member 400 and the cartridge 270, a wing fixator 286 may be formed. The wing fixator 286 may include an opened surface so that the wing 285 extending from the first wall 281 is fixed or coupled thereto.

The heat radiating pipe 500 may be provided between the outer case 12 and the flange 200a. Particularly, the heat radiating pipe 500 may be provided between the outer case 12 and the second wall 282 of the flange 200a.

The flange 200a may further include a coupling unit 290 to allow at least one end portion of the outer case 12 and the inner case 11 to be coupled thereto.

The coupling unit 290 may include an outer case coupling unit 291.

An end portion of the outer case 12 toward the front side of the storage compartment 20 may be bent. Particularly, the end portion of the outer case 12 toward the front side of the storage compartment 20 may be bent toward the inner case 11. The end portion of the outer case 12 toward the front side of the storage compartment 20 may be coupled to the outer case coupling unit 291. The outer case coupling unit 291 may be formed in the second wall 282. The outer case coupling unit 291 may be formed in a portion in the second wall 282 bent toward the inner case 11 of the main body 10. Particularly, the outer case coupling unit 291 may be formed in the second wall 282 having a shape of "⊃" in which one surface toward the outer case 12 of the main body 10 is opened. That is, the outer case coupling unit 291 may have the shape of "⊃".

The end portion of the outer case 12 toward the front side of the storage compartment 20 may be coupled to the outer case coupling unit 291 to surround at least one portion of the heat radiating pipe 500. The end portion of the outer case 12 toward the front side of the storage compartment 20 may be coupled to the outer case coupling unit 291 by passing through between the reinforcing member 400 and the heat radiating pipe 500.

The coupling unit 290 may further include an inner case coupling unit 292.

The inner case coupling unit 292 may be provided in the third wall 283. Particularly, an end portion of third wall 283 toward the front side of the storage compartment 20 may be bent with respect to the inner case 11 of the main body 10. In other words, the end portion of third wall 283 toward the front side of the storage compartment 20 may surround the inner case 11 of the main body 10. The inner case coupling unit 292 may be formed in a bent portion of the third wall 283. Therefore, a portion of the inner case coupling unit 292 may be placed in the outside of the inner case 11 and the other portion of the inner case coupling unit 292 may be placed in the inside of the inner case 11.

The inner case coupling unit 292 may have a shape of "∪" having an opened surface so that the inner case 11 of the main body 10 is coupled thereto. The inner case 11 of the main body 10 may be coupled to the inner case coupling unit 292 using the insertion method.

FIG. 8 is a cross-sectional view illustrating a flange according to a fifth embodiment in the refrigerator in accordance with one embodiment of the present disclosure. Hereinafter reference numerals not shown are referred to FIG. 7. A description of the same parts as those shown in FIGS. 4 to 7 will be omitted.

As illustrated in FIG. 8, the wing 285 extending from the first wall 281 may be fixed or coupled to the wing fixator 286. Accordingly, the flange 200a may be coupled more firmly between the inner case 11 and the outer case 12 of the main body 10.

The bent second wall 282 may be disposed between the outer case 12 coupled to the outer case coupling unit 291 and the heat radiating pipe 500. That is, the outer case 12 coupled to the outer case coupling unit 291 and the heat radiating pipe 500 may be separated by the bent second wall 282.

According to another aspect, a plurality of bent portions convexly protruded toward the inner case 11 of the main body 10 may be formed in the second wall 282. The heat radiating pipe 500 may be accommodated in any one of the plurality of bent portions. The end portion of the outer case 12 toward the front side of the storage compartment 20 may be coupled to the other of the plurality of bent portions. That is, the other of the plurality of bent portions may perform the same function as the outer case coupling unit 291. The heat radiating pipe 500 may be disposed in the more rear side than the end portion of the outer case 12 coupled to the other of the plurality of bent portions.

FIG. 9 is a cross-sectional view illustrating a flange according to a sixth embodiment in the refrigerator in accordance with one embodiment of the present disclosure. Hereinafter reference numerals not shown are referred to FIG. 7. A description of the same parts as those shown in FIGS. 4 to 7 will be omitted.

As illustrated in FIG. 9, the wing 285 extending from the 281 toward the outer case 12 of the main body 10 may be omitted.

The outer case coupling unit 291 may be provided in the second wall 282. Particularly, an end portion of second wall 282 toward the front side of the storage compartment 20 may be bent with respect to the outer case 12 of the main body 10. Alternatively, an end portion of second wall 282 toward the front side of the storage compartment 20 may be bent with respect to at least one of the heat radiating pipe 500 and the reinforcing member 400. The outer case coupling unit 291 may be formed in a bent portion of the second wall 282. The outer case coupling unit 291 may have an opened surface so that the outer case 12 of the main body 10 is coupled thereto. The outer case coupling unit 291 may surround the outer case 12 of the main body 10.

According to another aspect, the outer case coupling unit 291 may be formed between an extending portion 293 extending from the second wall 282 to face the outer wall of the outer case 12, and the reinforcing member 400 disposed between the outer case 12 and the second wall 282 to face the inner wall of the outer case 12. In brief, the outer case coupling unit 291 may be formed between the extending portion 293 of the second wall 282 extending toward the outside of the outer case 12 and the reinforcing member 400.

FIGS. 10A and 10B are cross-sectional views illustrating a coupling structure between the flange and the door in the refrigerator in accordance with one embodiment of the present disclosure. Hereinafter reference numerals not shown are referred to FIGS. 1 to 3. A description of the same parts as those shown in FIG. 4 will be omitted.

As illustrated in FIG. 10A, the sealing member 50 may be provided between the door 30 and the flange 200 to prevent the cool air of the storage compartment 20 from being leaked. The sealing member 50 may include a fixator 51 fixedly coupled to the door 30. The fixator 51 may be coupled to a fixation groove 36 formed on a rear surface of the door 30. The sealing member 50 may be fixed to the rear surface of the door 30 through a coupling between the fixator 51 and the fixation groove 36.

The sealing member 50 may further include a magnet 52. The magnet 52 may be provided inside of the sealing member 50 to interact with the outer case 12 formed of metal.

As illustrated in FIG. 10B, the refrigerator 1 may further include a sealing member 60. That is, the sealing member 60 described later in FIGS. 11 to 22 may be applied to the refrigerator 1. The sealing member 60 may include an adhesive member 600, instead of the magnet 52. The adhesive member 600 may be detachably attached to the flange 200. The adhesive member 600 may be provided on the sealing member 60. Particularly, the adhesive member 600 may be provided on the sealing member 60 to face the flange 200. That is, the adhesive member 600 may be provided on the sealing member 60 to interact with the flange 200 formed of plastic.

FIG. 11 is a cross-sectional view illustrating a structure between a door and a flange in the refrigerator in accordance with another embodiment of the present disclosure, and FIG. 12 is an enlarged view illustrating an adhesive member in accordance with a first embodiment of FIG. 11. Hereinafter reference numerals not shown are referred to FIGS. 1 to 3. A description of the same parts as those shown in FIGS. 1 to 3 will be omitted.

As illustrated in FIGS. 11 and 12, the refrigerator 1 may further include the sealing member 60 installed in the door 30 to enhance the tightness of the storage compartment 20 and configured to be closely contacted with the flange 200b according to the opening or closing of the door 30.

The flange 200b may be provided between the inner case 11 and the outer case 12 of the main body 10.

The flange 200b may connect the inner case 11 to the outer case 12 of the main body 10.

The flange 200b may include a contact surface 231a toward the front side of the storage compartment 20.

The contact surface 231a may include a material having a low heat transfer coefficient. The contact surface 231a may include a plastic material. As an example, the contact surface 231a may include at least one of polystyrene (PS), polypropylene (PP), polyimide (PI), and carbon nanotube composite material (CNT-Composite).

The contact surface 231a may have a flat shape.

The flange 200 and 200a described in FIGS. 4 to 10B may be applied to the refrigerator 1.

The sealing member 60 may include an adhesive member 600.

The adhesive member 600 may be provided on the sealing member 60 so that the sealing member 60 is detachably coupled or adhered to the contact surface 231a of the flange 200b. That is, the adhesive member 600 may be provided on the sealing member 60 to face the contact surface 231a of the flange 200b.

The adhesive member 600 may include at least one of polyurethane (PU), polyurethane acrylate (PUA), polydimethylsiloxane (PDMS), and polyvinyl siloxane (PVS).

The adhesive member 600 may include a dry adhesive member.

The adhesive member 600 may have a ciliary shape.

The adhesive member 600 may include a ciliary shape having at least one thickness unit of nanometers (nm) and a micrometer (μm)

The adhesive member 600 may include a body 630.

The body 630 may be fixed on the sealing member 60. The body 630 may be provided on the sealing member 60 to be extended toward the contact surface 231a of the flange 200b.

The body 630 may have a shape inclined with respect to a contact direction (Y) of the door 30 about the flange 200b.

The adhesive member 600 may further include a head 610.

The head 610 may be connected to the body 630 to be detachably coupled or adhered to the contact surface 231a. The head 610 may have a flat shape. In other words, the head 610 may have a flat shape to correspond to the contact surface 231a of the flange 200b.

The head 610 may have the same width as or a larger width than the body 630. Particularly, the head 610 may have the same width as or a larger width than the body 630 in a longitudinal direction (L) of the adhesive member 600.

The adhesive member 600 may further include a neck 620.

The neck 620 may be disposed between the head 610 and the body 630. The neck 620 may be provided to connect the head 610 to the body 630.

The neck 620 may have a smaller width than the head 610 and the body 630. Particularly, the neck 620 may have a smaller width than the head 610 and the body 630 in the longitudinal direction (L) of the adhesive member 600.

The adhesive member 600 may be coupled or adhered to the contact surface 231a formed of plastic by van der Waals forces.

The adhesive member 600 may have a thickness of equal to or more than 0.1 mm or a thickness of equal to or less than 1.0 mm in the contact direction (Y) of the door 30 about the flange 200b, but the thickness the adhesive member 600 is not limited thereto.

The adhesive member 600 may have 104 units or more than 104 units or 1012 units or less than 1012 units per area (cm2) of the sealing member 60, but the number of the adhesive member 600 is not limited thereto.

When the magnetic force between the outer case 12 formed of metal material and the magnet 52 (refer to FIG. 10A) provided in the sealing member 60 is used as the contact method between the main body 10 and the door 30, it may be possible to generate the significant energy loss caused by the heat bridge effect generated along the outer case 12 formed of metal material. Meanwhile, when the coupling force (van der Waals forces) between the adhesive member 600 provided in the sealing member 60, and the contact surface 231a formed of plastic material is used as the contact method between the main body 10 and the door 30, it may be possible to reduce an area of metal portion provided in the flange 200b and to reduce the energy loss caused by the heat bridge effect. In addition, it may be possible to remove the magnet 52 (refer to FIG. 10A) from the sealing member 60, thereby reducing the thickness of the sealing member 60. Particularly, when the magnet 52 (refer to FIG. 10A) is placed inside of the sealing member 60, the thickness of the sealing member 60 may be equal to or more than 8 mm or equal to or less than 12 mm in the contact direction (Y) of the door 30 about the flange 200b. Meanwhile, when the magnet 52 (refer to FIG. 10A) is removed from the inside of the sealing member 60, i.e., when the adhesive member 600 is disposed on the sealing member 60, the thickness of the sealing member 60 may be equal to or more than 3 mm or equal to or less than 5 mm in the contact direction (Y) of the door 30 about the flange 200b. The sealing member 60 may include a fixator 51 fixedly coupled to the door 30. The fixator 51 may be coupled to a fixation groove (not shown) formed on a rear surface of the door 30. The sealing member 60 may be fixed to the rear surface of the door 30 through a coupling between the fixator 51 and the fixation groove (not shown).

The adhesive member 600 may be made by at least one method of replica molding and photolithography.

FIG. 13 is a view illustrating an adhesive member in accordance with a second embodiment, in the refrigerator in accordance with another embodiment of the present disclosure. Hereinafter reference numerals not shown are referred to FIGS. 1 to 3. A description of the same parts as those shown in FIGS. 1 to 3 will be omitted.

As illustrated in FIG. 13, the adhesive member 600 may include at least one layer. That is, the adhesive member 600 may be formed by a single layer (refer to FIG. 12) or by a plurality of layers (refer to FIG. 13).

The adhesive member 600 formed by two layers will be described as an example of the adhesive member 600 having the plurality of layers.

The adhesive member 600 may include two layers which are stacked in the contact direction (Y) of the door 30 about the flange 200b (refer to FIG. 11).

The adhesive member 600 may include a first adhesive member 600a fixed to the sealing member 60 and a second adhesive member 600b fixed to the head 610 of the first adhesive member 600a. Each structure of the first adhesive member 600a and the second adhesive member 600b are the same as that illustrated in FIGS. 11 and 12. However, the second adhesive member 600b may be fixed to the head 610 of the first adhesive member 600a, and thus the thickness of the second adhesive member 600b may be less than the thickness of the first adhesive member 600a.

A body 630a of the second adhesive member 600b may be fixed to the head 610 of the first adhesive member 600a.

FIG. 14 is a cross-sectional view illustrating a structure between a door to which a guide is added, and a flange in the refrigerator in accordance with another embodiment of the present disclosure. Hereinafter reference numerals not shown are referred to FIGS. 1 to 3. A description of the same parts as those shown in FIGS. 1 to 3 will be omitted.

As illustrated in FIG. 14, the refrigerator 1 may further include at least one guide 640.

The at least one guide 640 may be disposed adjacent to the sealing member 60 to allow the adhesive member 600 to be easily accessed to or closely contacted with the contact surface 231a. That is, the at least one guide 640 may guide a movement of the adhesive member 600 in the contact direction (Y) of the door 30 about the flange 200b so that the adhesive member 600 is accurately coupled or adhered to the contact surface 231a. Particularly, the at least one guide 640 may include two guides disposed in opposite sides of the sealing member 60 in the longitudinal direction (L) of the adhesive member 600.

The at least one guide 640 may have an elastic material.

FIGS. 15A to 15C are views illustrating a modification process of the adhesive member according to opening or closing of the door in the refrigerator in accordance with another embodiment. Hereinafter reference numerals not shown are referred to FIGS. 1 to 3. A description of the same parts as those shown in FIGS. 1 to 3 and FIGS. 11 to 14 will be omitted.

FIG. 15A illustrates a case in which the storage compartment 20 is opened. As illustrated in FIG. 15A, the sealing member 60 may be fixed to the rear surface of the door 30 by the fixator 51. The adhesive member 600 may be stacked on the sealing member 60 to face the contact surface 231a in the contact direction (Y) of the door 30 about the flange 200b. In a process of closing the storage compartment 20, the door 30 may approach the flange 200b. In other words, the adhesive member 600 may approach the contact surface 231a provided in the flange 200b.

FIG. 15B illustrates a case in which the storage compartment 20 is closed. As illustrated in FIG. 15B, when the storage compartment 20 is closed, the sealing member 60 may be pressed in the contact direction (Y) of the door 30 about the flange 200b. In addition, as the sealing member 60 is pressed in the contact direction (Y) of the door 30 about the flange 200b, the adhesive member 600 may be coupled or adhered to the contact surface 231a. At this time, the sealing member 60 may become flat by the pressing force.

FIG. 15C illustrates a case in which the sealing member 60 regains its original thickness by an elastic force after the storage compartment 20 is closed. That is, when the pressing force applied in the contact direction (Y) of the door 30 about the flange 200b is offset by the elastic force, the sealing member 60 may regain its original thickness.

FIGS. 16A to 16C are views illustrating a first opening process of the door in the refrigerator in accordance with another embodiment. Hereinafter reference numerals not shown are referred to FIGS. 1 to 3. A description of the same parts as those shown in FIGS. 1 to 3 and FIGS. 11 to 14 will be omitted. A contact direction of the adhesive member 600 about the contact surface 231a refers to the same as the contact direction (Y) of the door 30 about the flange 200b.

FIGS. 16A to 16C illustrate the first opening process of the door 30, and it may be an appropriate opening process of the door 30.

FIG. 16A illustrates a case in which the storage compartment 20 is closed, and FIG. 16B illustrates a case in which the adhesive member 600 is separated from the contact surface 231a. FIG. 16C illustrates a case in which the adhesive member 600 is completely separated from the contact surface 231a and the storage compartment 20 is opened.

As illustrated in FIGS. 16A to 16C, with respect to the contact direction (Y) of the door 30 about the flange 200b, a center line of the fixator 51 (M) and a center line of the adhesive member 600 (N) may not coincide with each other. That is, with respect to the contact direction (Y) of the door 30 about the flange 200b, the center line of the fixator 51 (M) and the center line of the adhesive member 600 (N) may not match with each other. Particularly, when the center line of the fixator 51 (M) is formed relatively closer to the outer case 12 than the center line of the adhesive member 600 (N), the adhesive member 600 may be separated from the contact surface 231a in the direction (X) from the outer case 12 to the inner case 11 of the main body 10. A force required to separate the adhesive member 600 from the contact surface 231a may be less than a pulling force applied to the door 30 to open the storage compartment 20. Therefore, when a user pulls the door 30 to open the storage compartment 20, the adhesive member 600 may be easily separated from the contact surface 231a.

FIGS. 17A to 17C are views illustrating a second opening process of the door in the refrigerator in accordance with another embodiment. Hereinafter reference numerals not shown are referred to FIGS. 1 to 3. A description of the same parts as those shown in FIGS. 1 to 3 and FIGS. 11 to 14 will be omitted.

FIG. 17A illustrates a case in which the storage compartment 20 is closed, and FIG. 17B illustrates a case in which the adhesive member 600 is separated from the contact surface 231a. FIG. 17C illustrates a case in which the adhesive member 600 is completely separated from the contact surface 231a and the storage compartment 20 is opened.

As illustrated in FIGS. 17A to 17C, with respect to the contact direction (Y) of the door 30 about the flange 200b, the center line of the fixator 51 (M) (refer to FIG. 16A) and the center line of the adhesive member 600 (N) (refer to FIG. 16A) may coincide with each other. When the storage compartment 20 is closed, the adhesive member 600 may be maintained in a state of being coupled or adhered to the contact surface 231a while in a flat state. When a user pulls the door 30 to open the storage compartment 20, the sealing member 60 may be deformed. Particularly, the sealing member 60 may be deformed by a force that presses the sealing member 60 toward the center of the sealing member 60 from opposite sides of the sealing member 60. The adhesive member 600 may be coupled or adhered to the contact surface 231a while being crimped caused by the deformation of the sealing member 60, and as a result, the adhesive member 600 may be separated from the contact surface 231a since the coupling force between the adhesive member 600 and the contact surface 231a become weak.

FIGS. 18A to 18C are views illustrating a third opening process of the door in the refrigerator in accordance with another embodiment, and FIG. 19 is an enlarged view illustrating the adhesive member of FIGS. 18A to 18C. FIG. 20 is a graph illustrating the difference in the adhesion energy according to position of the head in the adhesive of FIG. 19. Hereinafter reference numerals not shown are referred to FIGS. 1 to 3. A description of the same parts as those shown in FIGS. 1 to 3 and FIGS. 11 to 14 will be omitted.

FIG. 18A illustrates a case in which the storage compartment 20 is closed, and FIG. 18B illustrates a case in which the adhesive member 600 is separated from the contact surface 231a. FIG. 18C illustrates a case in which the adhesive member 600 is completely separated from the contact surface 231a and the storage compartment 20 is opened.

As illustrated in FIGS. 18A to 19, with respect to the contact direction (Y) of the door 30 about the flange 200b, the center line of the fixator 51 (M) (refer to FIG. 16A) and the center line of the adhesive member 600 (N) (refer to FIG. 16A) may coincide with each other. The head 610 of the adhesive member 600 may have a polygonal shape. In other words, the head 610 of the adhesive member 600 may include a shape having the directivity. Particularly, the head 610 of the adhesive member 600 may have a triangular shape. One of vertexes of the head 610 may be directed to a separation start point (D) of the adhesive member 600 about the contact surface 231a. In other words, the adhesive member 600 may be disposed on the sealing member 60 such that one of vertexes of the head 610 is directed to the separation start point (D) of the adhesive member 600 about the contact surface 231a. When the storage compartment 20 is closed, the adhesive member 600 may be maintained in a state of being coupled or adhered to the contact surface 231a. In this time, one of vertexes of the head 610 may be directed to the separation start point (D) of the adhesive member 600 about the contact surface 231a. When a user pulls the door 30 to open the storage compartment 20, the separation of the adhesive member 600 from the contact surface 231a may be started from the separation start point (D).

According to another aspect, the adhesive member 600 may be disposed on the sealing member 60 such that one of vertexes of the head 610 is directed to the outer case 12 of the main body 10. When the storage compartment 20 is closed, the adhesive member 600 may be maintained in a state of being coupled or adhered to the contact surface 231a. In this time, one of vertexes of the head 610 may be directed to the outer case 12 of the main body 10. When a user pulls the door 30 to open the storage compartment 20, the separation of the adhesive member 600 from the contact surface 231a may be started in the direction (X) from the outer case 12 to the inner case 11 of the main body 10.

The third opening process of the door 30 may be caused by the difference in the adhesion energy according to the separation direction of the adhesive member 600. As illustrated in FIG. 20, when the head 610 of the adhesive member 600 has a triangular shape, the adhesive member 600 may have different adhesion energy in accordance with the position of the head 610. An arrow in the triangle may represent the separation direction. That is, the adhesive member 600 may be disposed on the sealing member 60 such that a portion indicated by the arrow of the head 610 is directed to the separation start point (D) of the adhesive member 600 about the contact surface 231a. According to the graph in FIG. 20, the position of the head 610 is indicated by angle (°) in the X axis, and the adhesion energy is indicated by a unit of J/m2 in the Y-axis. As illustrated in FIG. 20, the adhesion energy in vertexes of the head 610 (refer to 0° and 120°) may be less than an adhesion energy in edges. Therefore, when the adhesive member 600 is disposed on the sealing member 60 such that one of vertexes of the head 610 is directed to the separation start point (D) of the adhesive member 600 about the contact surface 231a, the adhesive member 600 may be smoothly separated from the contact surface 231a.

FIGS. 21A to 21C are views illustrating a fourth opening process of the door in the refrigerator in accordance with another embodiment, and FIG. 22 is a graph illustrating the difference in the adhesion energy according to an inclination of the body in the adhesive of FIGS. 21A to 21C. Hereinafter reference numerals not shown are referred to FIGS. 1 to 3. A description of the same parts as those shown in FIGS. 1 to 3 and FIGS. 11 to 14 will be omitted.

FIG. 21A illustrates a case in which the storage compartment 20 is closed, and FIG. 21B illustrates a case in which the adhesive member 600 is more closely contacted with the contact surface 231a. FIG. 21C illustrates a case in which the adhesive member 600 is separated from the contact surface 231a and the storage compartment 20 is opened.

As illustrated in FIGS. 21A to 21C, with respect to the contact direction (Y) of the door 30 about the flange 200b, the center line of the fixator 51 (M) (refer to FIG. 16A) and the center line of the adhesive member 600 (N) (refer to FIG. 16A) may coincide with each other. In the process of opening or closing the door 30 about the storage compartment 20, the body 630 of the adhesive member 600 may be inclined in the contact direction (Y) of the door 30 about the flange 200b. Particularly, when the storage compartment 20 is closed, the adhesive member 600 may be maintained in a state of being coupled or adhered to the contact surface 231a. In this time, the body 630 may be inclined toward the outer case 12 of the main body 10 with respect to the contact direction (Y) of the door 30 about the flange 200b. As the degree of contact or the degree of pressing of the door 30 against the flange 200b is increased, the gradient of the body 630 may be more increased. That is, as the degree of contact or the degree of pressing of the door 30 against the flange 200b is increased, the body 630 may be more inclined toward the outer case 12 of the main body 10 with respect to the contact direction (Y) of the door 30 about the flange 200b. As the gradient of the body 630 is increased toward the outer case 12 of the main body 10 with respect to the contact direction (Y) of the door 30 about the flange 200b, the adhesive force of the adhesive member 600 against the contact surface 231a may be increased. When a user pulls the door 30 to open the storage compartment 20, the inclination of the body 630 with respect to the contact direction (Y) of the door 30 about the flange 200b may be reduced. Particularly, when a user pulls the door 30 to open the storage compartment 20, the inclination of the body 630 toward the outer case 12 of the main body 10 with respect to the contact direction (Y) of the door 30 about the flange 200b may be reduced. As the gradient of the body 630 toward the outer case 12 of the main body 10 with respect to the contact direction (Y) of the door 30 about the flange 200b is reduced, the adhesive force of the adhesive member 600 against the contact surface 231a may be reduced. When a user pulls the door 30 to open the storage compartment 20, the inclination of the body 630 toward the outer case 12 of the main body 10 with respect to the contact direction (Y) of the door 30 about the flange 200b may be reduced, and thus the adhesive member 600 may be easily separated from the contact surface 231a.

The fourth opening process of the door 30 may be caused by the difference in the adhesion energy according to the separation direction of the adhesive member 600. According to the graph in FIG. 22, the inclined angle of the body 630 is indicated by an angle) (°) in the X axis, and the adhesion energy is indicated by a unit of N/cm2 in the Y-axis. The angle in the X axis is with respect to the longitudinal direction (P) of the sealing member 60. That is, when the body 630 lies in the longitudinal direction (P) of the sealing member 60, it may correspond to 0° in the X-axis. According to the graph of FIG. 22, as the sealing member 60 and the contact surface 231a become closer with respect to a point (S), i.e., as an angle of the body 630 is reduced in the contact direction (Y) of the door 30 about the flange 200b with respect to the longitudinal direction (P) of the sealing member 60, the adhesion energy may be increased. In contrast, as the sealing member 60 and the contact surface 231a become further with respect to the point (S), i.e., as an angle of the body 630 is increased in the contact direction (Y) of the door 30 about the flange 200b with respect to the longitudinal direction (P) of the sealing member 60, the adhesion energy may be reduced. A case in which the sealing member 60 and the contact surface 231a become closer may correspond to the case in which the storage compartment 20 is closed, and a case in which the sealing member 60 and the contact surface 231a become further may correspond to the case in which the storage compartment 20 is opened.

The above mentioned structure of flange 200, 200a and 200b and structure of the sealing member 60 in which the adhesive member 600 is provided may be applied to a refrigerator in which a foam insulation is used and a refrigerator in which a foam insulation and a vacuum insulation panel are used, as well as the refrigerator 1 in which the vacuum insulation panel is used.

Although a few embodiments of the present disclosure have been shown and described, it would be appreciated by those skilled in the art that changes may be made in these embodiments without departing from the principles and spirit of the disclosure, the scope of which is defined in the claims and their equivalents.

The invention claimed is:

1. A refrigerator comprising:
a main body provided with an inner case and an outer case;
a storage compartment formed by the inner case;
a door configured to open or close an open front surface of the storage compartment;
an insulation material provided between the inner case and the outer case to insulate the storage compartment;
a flange disposed separately from the outer case and the inner case and configured to be coupled to the inner case and the outer case, the flange being made of a material having a heat transfer coefficient lower than a heat transfer coefficient of a material of the inner case and lower than a heat transfer coefficient of a material of the outer case to exhibit an anisotropic thermal resistance; and
a seal coupled to the door and provided between the door and the flange to face the flange,
wherein the flange comprises a contact surface configured to be contacted with the seal according to opening or closing of the door and the seal includes an adhesive to allow the seal to be detachably adhered to the flange.

2. The refrigerator of claim 1, further comprising:
a heat radiating pipe configured to inhibit a phenomenon in which dewdrops are formed in at least one of the outer case and the flange due to the difference in the temperature between outside and inside the storage compartment.

3. The refrigerator of claim 1, wherein the flange includes a perforated section formed in at least one portion of the contact surface.

4. The refrigerator of claim 1, wherein
the adhesive comprises a dry adhesive having a ciliary shape.

5. The refrigerator of claim 1, wherein
the flange comprises at least one of polystyrene (PS), polypropylene (PP), polyimide (PI), and carbon nanotube composite material (CNT-Composite).

6. The refrigerator of claim 1, wherein
the flange comprises at least one chamber.

7. The refrigerator of claim 6, wherein
the at least one chamber comprises a foam chamber filled with porous media having a lower heat transfer coefficient than air, wherein the porous media comprises at least one of polystyrene foam (PS foam) and polyurethane foam (PU foam).

8. The refrigerator of claim 7, wherein
the foam chamber is formed by at least one wall which includes a perforated section.

9. The refrigerator of claim 1, wherein
the flange comprises:
a first frame configured to face the insulation material and disposed between the inner case and the outer case;
a plurality of second frames connected to the first frame and disposed apart from each other between the inner case and the outer case;
and a plurality of ribs configured to connect the plurality of second frames to each other.

10. The refrigerator of claim 9, wherein
the first frame comprises at least one disconnection portion.

11. The refrigerator of claim 1, further comprising
a reinforcing member provided between the flange and the outer case to improve a structural rigidity of the outer case, wherein the reinforcing member comprises a metal material.

12. A refrigerator comprising:
a main body provided with an inner case and an outer case;
a storage compartment formed by the inner case;
a door configured to open or close an open front surface of the storage compartment;
an insulation material provided between the inner case and the outer case to insulate the storage compartment;
a flange between the outer case and the inner case, the flange having an anisotropic thermal resistance; and
a seal coupled to the door and provided between the door and the flange to face the flange, the seal including an adhesive to allow the seal to be detachably adhered to the flange,
wherein the flange comprises a contact surface configured to be contacted with the seal according to opening or closing of the door.

* * * * *

UNITED STATES PATENT AND TRADEMARK OFFICE
CERTIFICATE OF CORRECTION

PATENT NO. : 10,852,054 B2
APPLICATION NO. : 15/512716
DATED : December 1, 2020
INVENTOR(S) : Min Soo Kim et al.

It is certified that error appears in the above-identified patent and that said Letters Patent is hereby corrected as shown below:

On the Title Page

Item [73] (Assignee), Line 7:
Delete "ELECTONICS" and insert -- ELECTRONICS --, therefor.

Signed and Sealed this
Thirteenth Day of December, 2022

Katherine Kelly Vidal
*Director of the United States Patent and Trademark Office*